US012613912B2

(12) United States Patent
Park et al.

(10) Patent No.: US 12,613,912 B2
(45) Date of Patent: Apr. 28, 2026

(54) ELECTRONIC DEVICE FOR AT LEAST ONE OF VIDEO MOMENT RETRIEVAL AND HIGHLIGHT DETECTION AND OPERATION METHOD THEREOF

(71) Applicants: Pyler Co., Ltd., Seoul (KR); Research & Business Foundation Sungkyunkwan University, Gyeonggi-do (KR)

(72) Inventors: Dong Chan Park, Seoul (KR); Jae Pil Heo, Gyeonggi-do (KR); Won Jun Moon, Gyeonggi-do (KR); Sang Eek Hyun, Gyeonggi-do (KR)

(73) Assignees: Pyler Co., Ltd., Seoul (KR); Research & Business Foundation Sungkyunkwan University, Gyeonggi-do (KR)

( * ) Notice: Subject to any disclaimer, the term of this patent is extended or adjusted under 35 U.S.C. 154(b) by 0 days.

(21) Appl. No.: 19/108,804

(22) PCT Filed: Aug. 28, 2024

(86) PCT No.: PCT/KR2024/012818
§ 371 (c)(1),
(2) Date: Mar. 5, 2025

(87) PCT Pub. No.: WO2025/053528
PCT Pub. Date: Mar. 13, 2025

(65) Prior Publication Data

US 2025/0258864 A1 Aug. 14, 2025

(30) Foreign Application Priority Data

Sep. 4, 2023 (KR) ........................ 10-2023-0116654
Apr. 5, 2024 (KR) ........................ 10-2024-0046772

(51) Int. Cl.
*G06F 16/00* (2019.01)
*G06F 16/735* (2019.01)
(Continued)

(52) U.S. Cl.
CPC ............ *G06F 16/735* (2019.01); *G06V 10/82* (2022.01); *G06V 20/46* (2022.01)

(58) Field of Classification Search
CPC ....... G06F 16/735; G06V 20/46; G06V 10/82
(Continued)

(56) References Cited

U.S. PATENT DOCUMENTS

2019/0272646 A1* 9/2019 Wnuk ..................... G06T 7/246
2023/0130006 A1* 4/2023 He ....................... G06N 3/0464 382/159
2024/0037948 A1* 2/2024 Chen ...................... G06V 20/46

FOREIGN PATENT DOCUMENTS

CN 116089653 5/2023
KR 10-2020-0075086 6/2020
(Continued)

OTHER PUBLICATIONS

Decision to Grant Dated Jan. 10, 2025 From the Korean Intellectual Property Office Re. Application No. 10-2024-0046772 and Its Translation Into English. (4 Pages).
International Search Report and the Written Opinion Dated Jan. 24, 2025 From the International Searching Authority Re. Application No. PCT/KR2024/012818 and Its Translation Into English. (14 Pages).
(Continued)

*Primary Examiner* — Raquel Perez-Arroyo

(57) ABSTRACT

Proposed is an electronic device for at least one of video moment retrieval and highlight detection which includes a storage unit and a processor, wherein the processor obtains a plurality of first video features from a video, obtains a text query feature from a text query, obtains a plurality of weights from the plurality of first video features and the text query feature, obtains a plurality of second video features from the plurality of weights and the plurality of first video
(Continued)

features, obtains a plurality of third video features from the plurality of second video features by using an encoder, obtains a plurality of fourth video features from the plurality of third video features and a time query by using a decoder, and selects at least one of time points or time periods of the video by using the plurality of fourth video features.

12 Claims, 19 Drawing Sheets

(51) Int. Cl.

| | |
|---|---|
| ***G06V 10/82*** | (2022.01) |
| ***G06V 20/40*** | (2022.01) |

(58) Field of Classification Search
USPC .......................................................... 707/769
See application file for complete search history.

(56) References Cited

FOREIGN PATENT DOCUMENTS

| | | |
|---|---|---|
| KR | 10-2022-0167056 | 12/2022 |
| KR | 10-2023-0012785 | 1/2023 |
| KR | 10-2023-0085103 | 6/2023 |
| KR | 10-2023-0109931 | 7/2023 |

OTHER PUBLICATIONS

Notice to Submit A Response Dated Jun. 20, 2024 From the Korean Intellectual Property Office Re. Application No. 10-2024-0046772 and Its Translation Into English. (14 Pages).

Moon et al. "Query-Dependent Video Representation for Moment Retrieval and Highlight Detection", Computer Vision and Pattern Recognition 2023, ArXiv Preprint ArXiv: 2303.13874v1, 12 P., Mar. 24, 2023.

* cited by examiner

ELECTRONIC DEVICE FOR AT LEAST ONE OF VIDEO MOMENT RETRIEVAL AND HIGHLIGHT DETECTION AND OPERATION METHOD THEREOF

RELATED APPLICATIONS

This application is a National Phase of PCT Patent Application No. PCT/KR2024/012818 having International filing date of Aug. 28, 2024, which claims the benefit of priority of Republic of Korea Patent Application Nos. 10-2024-0046772 filed on Apr. 5, 2024 and 10-2023-0116654 filed on Sep. 4, 2023. The contents of the above applications are all incorporated by reference as if fully set forth herein in their entirety.

FIELD AND BACKGROUND OF THE INVENTION

The present disclosure relates to an electronic device and an operation method thereof. More specifically, the present disclosure relates to an electronic device for at least one of video moment retrieval and highlight detection and an operation method thereof. In addition, the present disclosure relates to an electronic device for learning at least one of video moment retrieval and highlight detection and an operation method thereof. Herein, video moment retrieval refers to a task of retrieving for a moment relevant to a given text query in a video. Meanwhile, highlight detection aims to measure an importance of each time point or time period in relation to a given text query in a given video.

With the development of digital devices and platforms, the amount of video data is explosively increasing. However, as the amount of video data increases, more and more viewers want to retrieve for only preferred scenes or to view only important scenes in a video. Therefore, research has been conducted on video moment retrieval and highlight detection technologies, but the performance of such technologies still needs to be improved. For example, conventional studies have not properly modeled the impact of text queries. For example, the relevance of text queries has not had a significant impact on results of video moment retrieval and highlight detection. Therefore, research is necessary on video moment retrieval and highlight detection technologies with improved performance by properly modeling the impact of text queries.

SUMMARY OF THE INVENTION

Technical Problem

A task to be solved by the present disclosure is to provide an electronic device for at least one of video moment retrieval and highlight detection with improved performance and an operation method thereof.

A task to be solved by the present disclosure is to provide an electronic device for learning at least one of video moment retrieval and highlight detection with improved performance and an operation method thereof.

Technical Solution

According to an exemplary embodiment of the present disclosure, an electronic device for at least one of video moment retrieval and highlight detection includes a storage unit and a processor, wherein the processor obtains a plurality of first video features each corresponding to a plurality of time points or time periods different from one another from a video, obtains a text query feature from a text query, obtains a plurality of weights from the plurality of first video features and the text query feature, obtains a plurality of second video features from the plurality of weights and the plurality of first video features, obtains a plurality of third video features from the plurality of second video features by using an encoder, obtains a plurality of fourth video features from the plurality of third video features and a time query by using a decoder, and selects at least one of the plurality of time points or time periods different from one another from the video by using the plurality of fourth video features.

According to an exemplary embodiment of the present disclosure, a method of operating an electronic device for at least one of video moment retrieval and highlight detection includes obtaining a plurality of first video features each corresponding to a plurality of time points or time periods different from one another from a video, obtaining a text query feature from a text query, obtaining a plurality of weights from the plurality of first video features and the text query feature, obtaining a plurality of second video features from the plurality of weights and the plurality of first video features, obtaining a plurality of third video features from the plurality of second video features by using an encoder, obtaining a plurality of fourth video features from the plurality of third video features and a time query by using a decoder, and selecting at least one of the plurality of time points or time periods different from one another from the video by using the plurality of fourth video features.

According to an exemplary embodiment of the present disclosure, an electronic device for learning at least one of video moment retrieval and highlight detection includes a storage unit and a processor, wherein the processor obtains a plurality of first video features, a first saliency score of a first time point or a first time period of a video for a first text query, and a second saliency score of a second time point or a second time period of the video for the first text query from the video, the first text query that is positively paired with the video, and a saliency token by using a cross-attention model and an encoder, obtains a plurality of second video features and a third saliency score of the video for a second text query from the video, the second text query that is negatively paired with the video and the saliency token by using the cross-attention model and the encoder, and modifies the cross-attention model, the encoder, and the saliency token such that the first saliency score is greater than the second saliency score and the first saliency score increases whereas the second saliency score and the third saliency score decrease.

According to an exemplary embodiment of the present disclosure, a method of operating an electronic device for learning at least one of video moment retrieval and highlight detection includes obtaining a plurality of first video features, a first saliency score of a first time point or a first time period of a video for a first text query, and a second saliency score of a second time point or a second time period of the video for the first text query from the video, the first text query that is positively paired with the video, and a saliency token by using a cross-attention model and an encoder, obtaining a plurality of second video features and a third saliency score of the video for a second text query from the video, the second text query that is negatively paired with the video and the saliency token by using the cross-attention model and the encoder, and modifying the cross-attention model, the encoder, and the saliency token such that the first saliency score is greater than the second saliency score and the first saliency score increases whereas the second saliency score and the third saliency score decrease.

Advantageous Effects

According to an exemplary embodiment of the present disclosure, an impact of text queries on video features may be modeled through cross-attention between text queries and video clips. Therefore, the performance of video moment retrieval and highlight detection may be improved by allowing text queries to impact on output values of video moment retrieval and highlight detection.

According to an exemplary embodiment of the present disclosure, the impact of text queries may be effectively learned by training models to reduce saliency scores of text queries irrelevant to video. Therefore, the performance of video moment retrieval and highlight detection may be improved by more accurately modeling the impact of text queries on output values of video moment retrieval and highlight detection.

According to an exemplary embodiment of the present disclosure, it may be possible to predict saliency scores in an input-adaptive (query-dependent) way by using a saliency token whose value changes according to an inputted video and text query. Accordingly, the performance of video highlight detection may be improved.

DESCRIPTION OF THE REFERENCE NUMERALS IN THE DRAWINGS

100, 200: Electronic device
110, 210: Storage unit
120, 220: Processor
MD, MD2: Artificial intelligence model

DESCRIPTION OF SPECIFIC EMBODIMENTS OF THE INVENTION

Hereinafter, an operation principle of a preferred exemplary embodiment of the present disclosure will be described in detail with reference to the accompanying drawings. In addition, when describing exemplary embodiments of the present disclosure, the detailed description will be omitted when it is determined that specific descriptions of related known features or configurations would obscure the essence of the present disclosure. Also, the terms used below are defined in consideration of functions in the present disclosure and may vary depending on the intention or custom of the user or operator. Therefore, the definition of the terms used should be interpreted on the basis of the content and corresponding functions throughout this specification.

Figure 1:
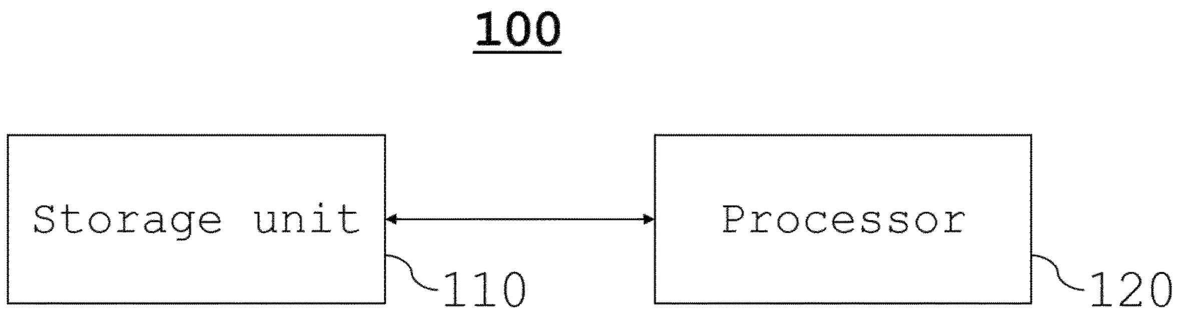
FIG. 1 is a schematic block diagram of an electronic device for at least one of video moment retrieval and highlight detection according to an exemplary embodiment of the present disclosure.

FIG. 1 is a schematic block diagram of an electronic device for at least one of video moment retrieval and highlight detection according to an exemplary embodiment of the present disclosure. Referring to FIG. 1, an electronic device 100 may include a storage unit 110 and a processor 120.

The storage unit 110 may store various types of data and programs. For example, the storage unit 110 may store an artificial intelligence model MD or MD-4 (see FIGS. 2 and 4 respectively). In an exemplary embodiment, the storage unit 110 may store video data and text query data which are inputted to the artificial intelligence model. The storage unit 110 may include at least one of a volatile memory and a nonvolatile memory. For example, the volatile memory may include DRAM, SRAM, SDRAM, DDR SDRAM, FeRAM, MRAM, PRAM, PoRAM, or ReRAM. For example, the nonvolatile memory may include a flash memory, a mask ROM, PROM, OTPROM, EPROM, EEPROM, a hard disk, or an optical disk.

The processor 120 may control overall operations of the electronic device 100. The processor 120 may control the storage unit 110. For example, the processor 120 may include at least one of a central processing unit (CPU) and a graphics processing unit (GPU).

In an exemplary embodiment, the processor 120 may obtain a plurality of first video features each corresponding to a plurality of time points or time periods different from one another from a video, obtain a text query feature from a text query, obtain a plurality of weights from the plurality of first video features and the text query feature, obtain a plurality of second video features from the plurality of weights and the plurality of first video features, obtain a plurality of third video features from the plurality of second video features by using an encoder, obtain a plurality of fourth video features from the plurality of third video features and a time query by using a decoder, and select at least one of the plurality of time points or time periods different from one another from the video by using the plurality of fourth video features. In an exemplary embodiment, the encoder may be an encoder of a transformer and the decoder may be a decoder of the transformer. In an exemplary embodiment, the time query may include a central time point and a length which define a time period.

In an exemplary embodiment, the processor 120, in order to obtain the plurality of weights, may obtain a plurality of video queries from the plurality of first video features, obtain a text key from the text query feature, obtain a text value from the text query feature, obtain a plurality of attention scores by using the plurality of video queries, the text key, and the text value, and obtain the plurality of weights from the plurality of attention scores.

In an exemplary embodiment, the processor 120, in order to obtain the plurality of third video features, may obtain the plurality of third video features and a second saliency token from the plurality of second video features and a first saliency token by using the encoder.

In an exemplary embodiment, the processor 120 may obtain a plurality of saliency scores of the plurality of time points or time periods different from one another from the plurality of third video features and the second saliency token.

Figure 2:
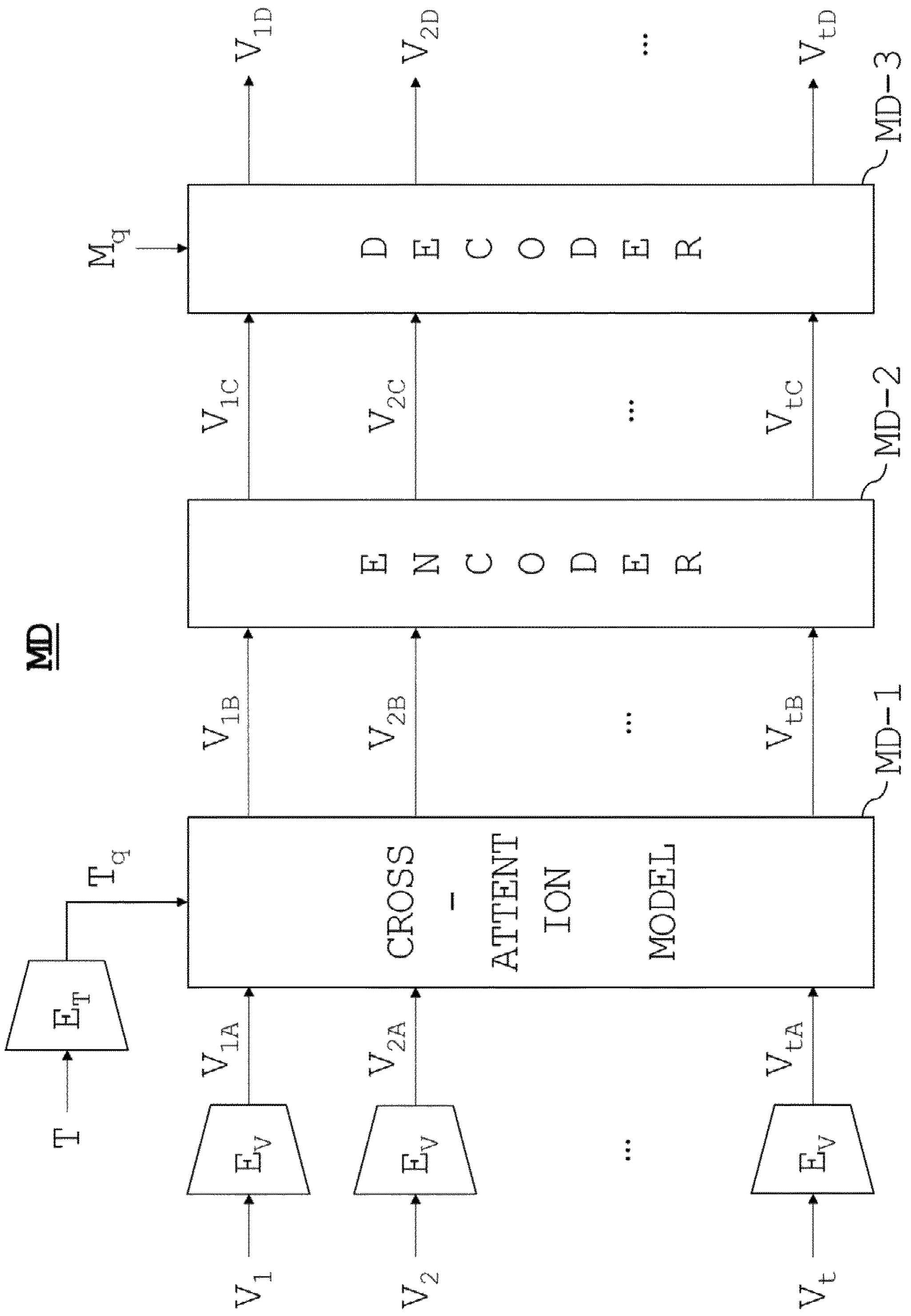
FIG. 2 is a conceptual diagram of an artificial intelligence model used in the electronic device of FIG. 1.

FIG. 2 is a conceptual diagram of the artificial intelligence model used in the electronic device of FIG. 1. Referring to FIG. 2, the artificial intelligence model MD may include a video encoder $E_V$, a text encoder $E_T$, a cross-attention model MD-1, the encoder MD-2 and the decoder MD-3.

The video encoder $E_V$ may obtain the plurality of first video features $V_{1A}$ to $V_{tA}$ each corresponding to the plurality of time points or time periods different from one another from the video. That is, the processor 120 may obtain the plurality of first video features $V_{1A}$ to $V_{tA}$ each corresponding to the plurality of time points or time periods different from one another from the video by using the video encoder $E_V$. For example, the processor 120 may obtain the plurality of first video features $V_{1A}$ to $V_{tA}$ from a plurality of video clips $V_1$ to $V_t$ each corresponding to the plurality of time points or time periods different from one another by using the video encoder $E_V$. In an exemplary embodiment, the video encoder $E_V$ may include at least one of a convolutional neural network-based model and a transformer-based model. Each of the first video features $V_{1A}$ to $V_{tA}$ may be a vector.

The text encoder $E_T$ may obtain the text query feature $T_q$ from the text query T. That is, the processor 120 may obtain the text query feature $T_q$ from the text query T by using the text encoder $E_T$. In an exemplary embodiment, the text encoder $E_T$ may include at least one of a recurrent neural network-based model and a transformer-based model. When the text query includes n tokens, the text query feature $T_q$ may include n vectors.

The cross-attention model MD-1 may obtain the plurality of second video features $V_{1B}$ to $V_{tB}$ from the plurality of first video features $V_{1A}$ to VA and the text query feature $T_q$ by correcting the plurality of first video features $V_{1A}$ to $V_{tA}$ using the text query feature $T_q$. That is, the processor 120 may obtain the plurality of second video features $V_{1B}$ to $V_{tB}$ from the plurality of first video features $V_{1A}$ to $V_{tA}$ and the text query feature $T_q$ by correcting the plurality of first video features $V_{1A}$ to $V_{tA}$ using the cross-attention model MD-1 and using the text query feature $T_q$. The cross-attention model MD-1 may model a relationship between the text query T and each of the video clips $V_1$ to $V_t$ by correcting the plurality of first video features $V_{1A}$ to $V_{tA}$ using the text query feature $T_q$. Accordingly, the cross-attention model MD-1 may contribute to improving the performance of moment retrieval and highlight detection.

Figure 3:
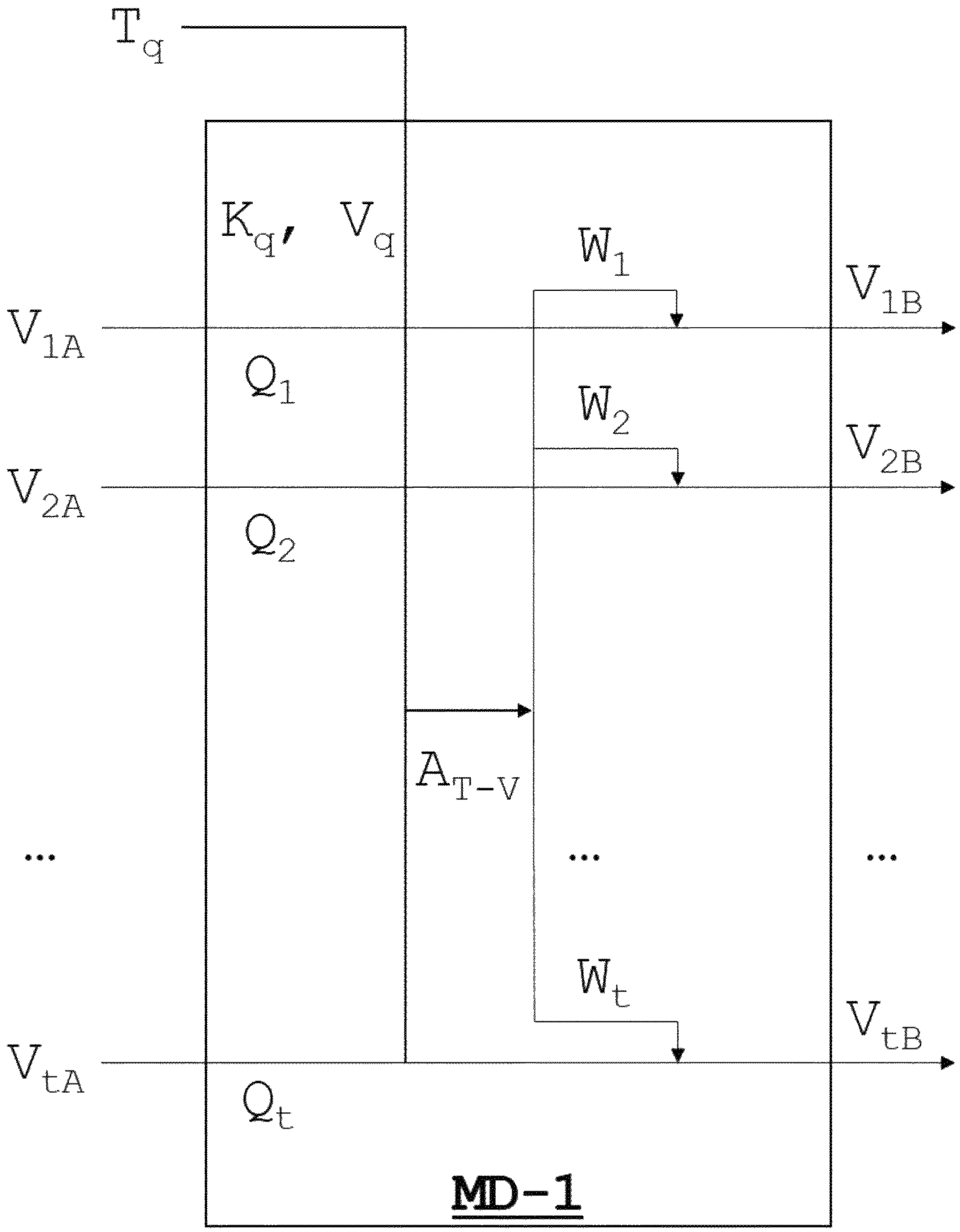
FIG. 3 is a conceptual diagram of a cross-attention model used in the electronic device of FIG. 1.

FIG. 3 is a conceptual diagram of the cross-attention model used in the electronic device of FIG. 1. Referring to FIG. 3, the cross-attention model MD-1 may obtain the plurality of weights $W_1$ to $W_t$ from the plurality of first video features $V_{1A}$ to $V_{tA}$ and the text query feature $T_q$, and obtain the plurality of second video features $V_{1B}$ to $V_{tB}$ from the plurality of weights $W_1$ to $W_t$ and the plurality of first video features $V_{1A}$ to $V_{tA}$. That is, the processor 120 may obtain the plurality of weights $W_1$ to $W_t$ from the plurality of first video features $V_{1A}$ to $V_{tA}$ and the text query feature $T_q$, and obtain the plurality of second video features $V_{1B}$ to $V_{tB}$ from the plurality of weights $W_1$ to $W_t$ and the plurality of first video features $V_{1A}$ to $V_{tA}$ by using the cross-attention model MD-1.

In an exemplary embodiment, the processor 120, in order to obtain the plurality of weights $W_1$ to $W_t$, may obtain a plurality of video queries $Q_1$ to $Q_t$ from the plurality of first video features $V_{1A}$ to $V_{tA}$, obtain the text key $K_q$ from the text query feature $T_q$, obtain the text value $V_q$ from the text query feature $T_q$, obtain the plurality of attention scores $A_{T\text{-}V}$ by using the plurality of video queries $Q_1$ to $Q_t$, the text key $K_q$, and the text value $V_q$, and obtain the plurality of weights $W_1$ to $W_t$ from the plurality of attention scores $A_{T\text{-}V}$.

In an exemplary embodiment, the processor 120 may obtain the plurality of video queries $Q_1$ to $Q_t$ from the plurality of first video features $V_{1A}$ to $V_{tA}$ by using artificial neural networks such as a multi-layer perceptron (MLP). In addition, the processor 120 may obtain the text key $K_q$ and the text value $V_q$ from the text query feature $T_q$ by using artificial neural networks such as a multi-layer perceptron. When the text query T includes n tokens, the text query feature $T_q$ may include n vectors, the text key $K_q$ may include n vectors, and the text value $V_q$ may include n vectors. The processor 120 may obtain the plurality of attention scores $A_{T\text{-}V}$ from the plurality of video queries $Q_1$ to $Q_t$, the text key $K_q$, and the text value $V_q$ by using [Equation 1].

$$\text{Attention}(Q, K_q, V_q) = \text{softmax}\left(QK_q^T / \sqrt{d}\right)V_q \quad \text{[Equation 1]}$$

Herein, Q is the video queries $Q_1$ to $Q_t$, $K_q$ is the text key, and $V_q$ is the text value. d is a dimension of the video queries $Q_1$ to $Q_t$, the text key $K_q$, and the text value $V_q$. Since the softmax value depends on the text key $K_q$ and the video queries $Q_1$ to $Q_t$, the video clips may be expressed on the basis of the similarity with the text key $K_q$.

For example, the processor 120 may obtain the plurality of weights $W_1$ to $W_t$ for the plurality of first video features $V_{iA}$ to $V_{tA}$ from the plurality of attention scores $A_{T\text{-}V}$ by using an artificial neural network such as a multi-layer perceptron.

For example, the processor 120 may obtain the plurality of second video features $V_{1B}$ to $V_{tB}$ by multiplying each of the plurality of first video features $V_{iA}$ to $V_{tA}$ by each of the plurality of weights $W_1$ to $W_t$. Reference will be made again to FIG. 2 below.

The encoder MD-2 may obtain the plurality of third video features $V_{1C}$ to $V_{tC}$ from the plurality of second video features $V_{1B}$ to $V_{tB}$. That is, the processor 120 may obtain the plurality of third video features $V_{1C}$ to $V_{tC}$ from the plurality of second video features $V_{1B}$ to $V_{tB}$ by using the encoder MD-2. In an exemplary embodiment, the encoder MD-2 may be, for example, an encoder of a transformer.

The decoder MD-3 may obtain the plurality of fourth video features $V_{1D}$ to $V_{tD}$ from the plurality of third video features Vic to $V_{tC}$ and the time query Mg. That is, the processor 120 may obtain the plurality of fourth video features $V_{1D}$ to $V_{tD}$ from the plurality of third video features $V_{1C}$ to $V_{tC}$ and the time query $M_q$ by using the decoder MD-3. In an exemplary embodiment, the decoder MD-3 may be, for example, a decoder of a transformer. In an exemplary embodiment, since the plurality of third video features $V_{1C}$ to $V_{tC}$ includes information on the text query T, the text query may not be separately inputted to the decoder MD-3.

In an exemplary embodiment, the time query Mq may include the central time point and the length of the time period that define the time period. For example, when the time query Mg includes the central time point 100 and the length of the time period 20, the time query $M_q$ may mean the time period of 80 to 120. The time query $M_q$ may have a trained value. In an exemplary embodiment, the processor 120 (see FIG. 1) may extract features around the central time point and modulate the cross-attention map with the length of the time period. The central time point and the length of the time period may be trained for each layer of the decoder MD-3.

In an exemplary embodiment, the processor 120 may select at least one of the plurality of time points or time periods 1 to t different from one another in the video by using the plurality of fourth video features $V_{1D}$ to $V_{tD}$. That is, the processor 120 may perform a moment retrieval of the video for a given text query.

Figure 4:
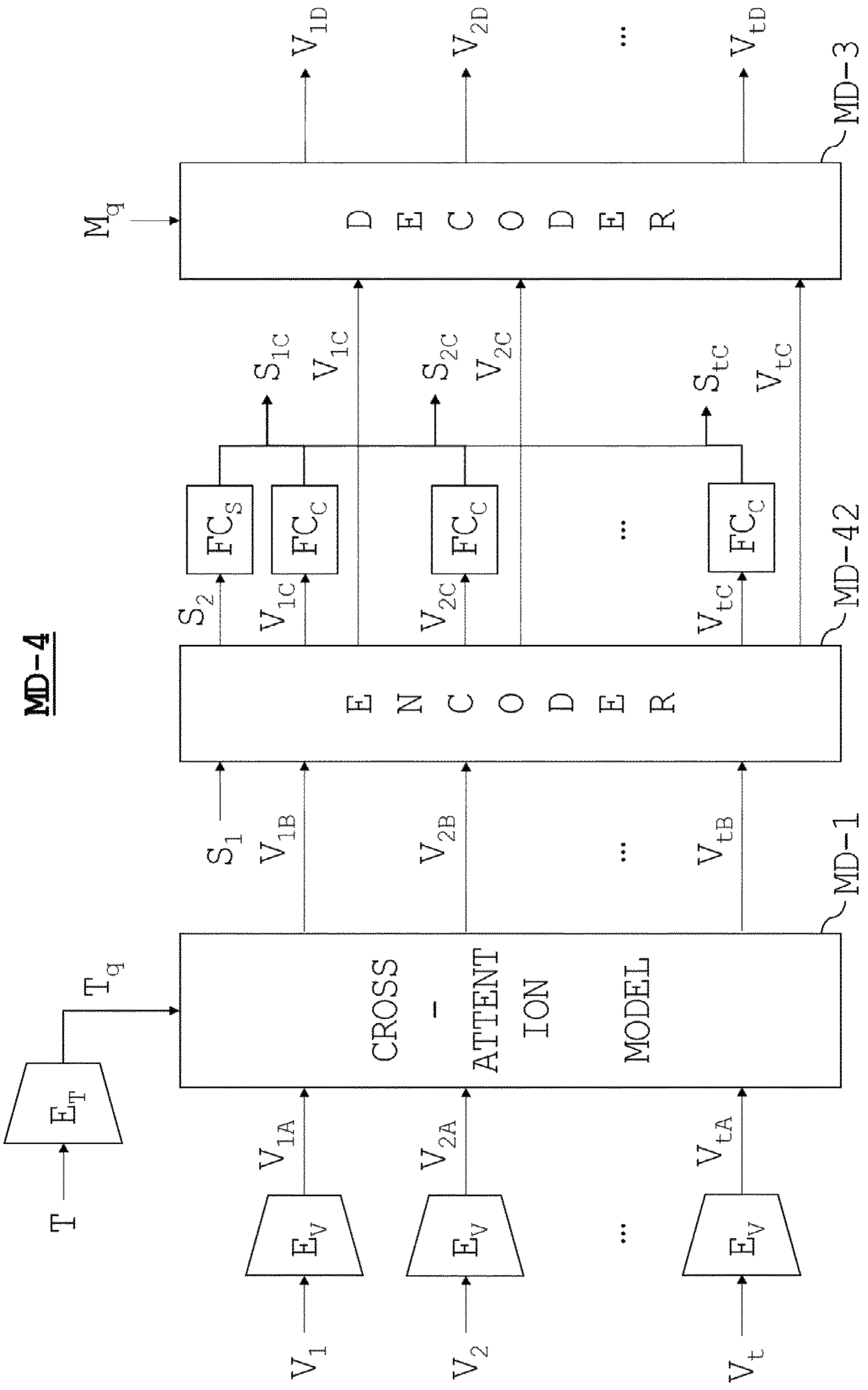
FIG. 4 is a conceptual diagram of an artificial intelligence model used in the electronic device of FIG. 1.

FIG. 4 is a conceptual diagram of the artificial intelligence model used in the electronic device of FIG. 1. Referring to FIG. 4, the encoder MD-42 of the artificial intelligence model MD-4 may obtain the plurality of third video features $V_{1C}$ to $V_{tC}$ and the second saliency token $S_2$ from the plurality of second video features $V_{1B}$ to $V_{tB}$ and the first saliency token $S_1$. That is, the processor 120 may obtain the plurality of third video features $V_{1C}$ to $V_{tC}$ and the second saliency token $S_2$ from the plurality of second video features $V_1$ to $V_{tB}$ and the first saliency token S1 by using the encoder MD-42. For example, the processor 120 may obtain one input tensor by concatenating the second video features $V_1$ to $V_{tB}$ and the first saliency token $S_1$, and obtain the plurality of third video features $V_{1C}$ to $V_{tC}$ and the second saliency token $S_2$ from the input tensor by using the encoder MD-42. The second saliency token $S_2$ may be referred to as an input-adaptive saliency predictor, and may be reconstructed into an input-dependent context by the encoder MD-42.

In an exemplary embodiment, the processor 120 may obtain each of the plurality of saliency scores $S_{1C}$ to $S_{tC}$ for each of the plurality of time points or time periods different from one another from the plurality of third video features $V_{1C}$ to $V_{tC}$ and the second saliency token $S_2$. In an exemplary embodiment, each of the first saliency token $S_1$ and the second saliency token $S_2$ may be a trainable vector and may be randomly set at the start of training. For example, the processor 120 may obtain each of the plurality of saliency scores $S_{1C}$ to $S_{tC}$ for each of the plurality of time points or time periods different from one another according to [Equation 2].

$$S_i = FC_S(S_2)\cdot FC_C(V_i)\Big/\sqrt{d} \qquad \text{[Equation 2]}$$

Here, $S_i$ is a saliency score corresponding to the i-th time point or time period, $FC_S(\ )$ and $FC_C(\ )$ are a fully connected layer respectively, $S_2$ is the second saliency token, $V_i$ is a third video feature corresponding to the i-th time point or time period among the plurality of third video features $V_{1C}$ to $V_{tC}$, and d is a dimension of $FC_S(S_2)$ and $FC_C(V_i)$. • is the inner product (d). The encoder MD-42 may obtain each saliency score of each time point or time period using the second saliency token $S_2$ different according to the text query T and the video clips $V_1$ to $V_t$, thereby calculating the saliency scores more accurately and modelling the change in the saliency scores according to the text query T more accurately.

Figure 5:
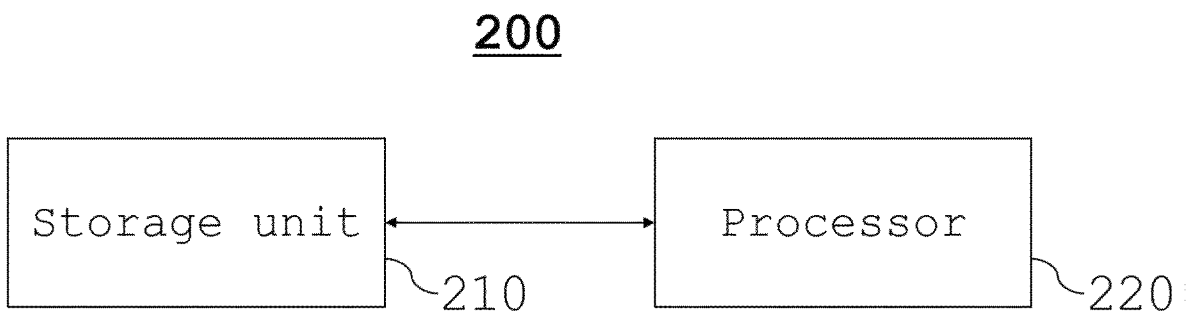
FIG. 5 is a schematic block diagram of an electronic device for learning at least one of video moment retrieval and highlight detection according to an exemplary embodiment of the present disclosure.

FIG. 5 is a schematic block diagram of an electronic device for learning at least one of video moment retrieval and highlight detection according to an exemplary embodiment of the present disclosure. Referring to FIG. 5, an electronic device 200 may include a storage unit 210 and a processor 220.

The storage unit 210 may store various types of data and programs. For example, the storage unit 210 may store an artificial intelligence model MD2 or MD2-4 (see FIGS. 7 and 8, respectively). In an exemplary embodiment, the storage unit 210 may store video data and text query data that are inputted to the artificial intelligence model. The storage unit 210 may include at least one of a volatile memory and a nonvolatile memory. For example, the volatile memory may include DRAM, SRAM, SDRAM, DDR SDRAM, FeRAM, MRAM, PRAM, PoRAM, or ReRAM. For example, the nonvolatile memory may include a flash memory, a mask ROM, PROM, OTPROM, EPROM, EEPROM, a hard disk, or an optical disk.

The processor 220 may control overall operations of the electronic device 200. The processor 220 may control the storage unit 210. For example, the processor 220 may include at least one of a central processing unit (CPU) and a graphics processing unit (GPU).

In an exemplary embodiment, the processor 220 may obtain the plurality of first video features, the first saliency score of the first time point or the first time period of the video for the first text query, and the second saliency score of the second time point or the second time period of the video for the first text query from the video, the first text query that is positively paired with the video, and the saliency token by using the cross-attention model and the encoder, may obtain the plurality of second video features and the third saliency score of the video for the second text query from the video, the second text query that is negatively paired with the video and the saliency token by using the cross-attention model and the encoder, and may modify the cross-attention model, the encoder, and the saliency token such that the first saliency score is greater than the second saliency score, and the first saliency score increases whereas the second saliency score and the third saliency score decrease.

In an exemplary embodiment, the processor 220 may obtain the plurality of third video features from the plurality of first video features and the time query by using the decoder, and may select at least one of the plurality of time points or time periods different from one another by using the plurality of third video features.

In an exemplary embodiment, the processor 220 may modify the cross-attention model, the encoder, and the decoder to reduce a difference between the selected time point or time period and a correct time point or time period.

In an exemplary embodiment, the processor 220 may classify whether the selected at least one time point or time period is a foreground or a background, and modify the cross-attention model, the encoder, and the decoder so that the prediction of whether it is the foreground or background is the same as the actual correct answer.

Figure 6:
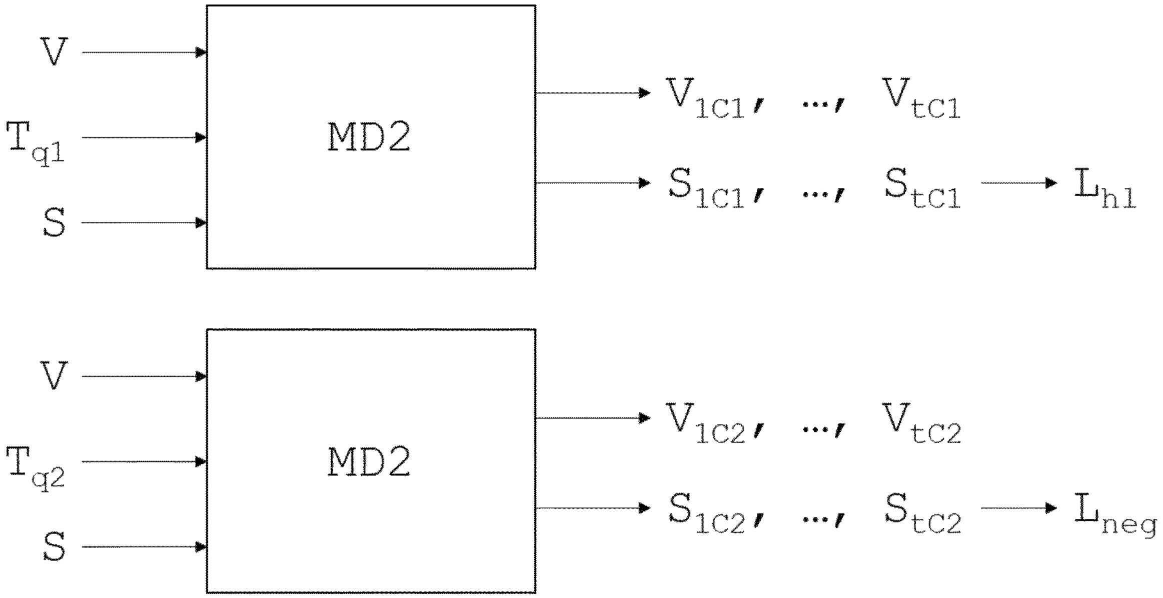
FIG. 6 is a conceptual diagram for explaining the electronic device of FIG. 5.

FIG. 6 is a conceptual diagram for explaining the electronic device of FIG. 5. Referring to FIG. 6, the processor 220 may obtain the plurality of first video features $V_{1C1}$ to $V_{tC1}$ and the plurality of saliency scores $S_{1C1}$ to $S_{tC1}$ of the plurality of time points or time periods 1 to t different from one another in the video V for the first text query $T_{q1}$ from the video V, the first text query $T_{q1}$ that is positively paired with the video V, and the saliency token S by using the artificial intelligence model MD2. In addition, the processor 220 may obtain the plurality of second video features $V_{1C2}$ to $V_{tC2}$ and the plurality of saliency scores $S_{1C2}$ to $S_{tC2}$ of the plurality of time points or time periods 1 to t different from one another in the video V for the second text query $T_{q2}$ from the video V, the second text query $T_{q2}$ that is negatively paired with the video V, and the saliency token S by using the artificial intelligence model MD2. In the present specification, the positive pair of a video and a text query may mean that the text query is relevant to the video, and the negative pair of a video and a text query may mean that the text query is irrelevant to the video.

Figure 7:
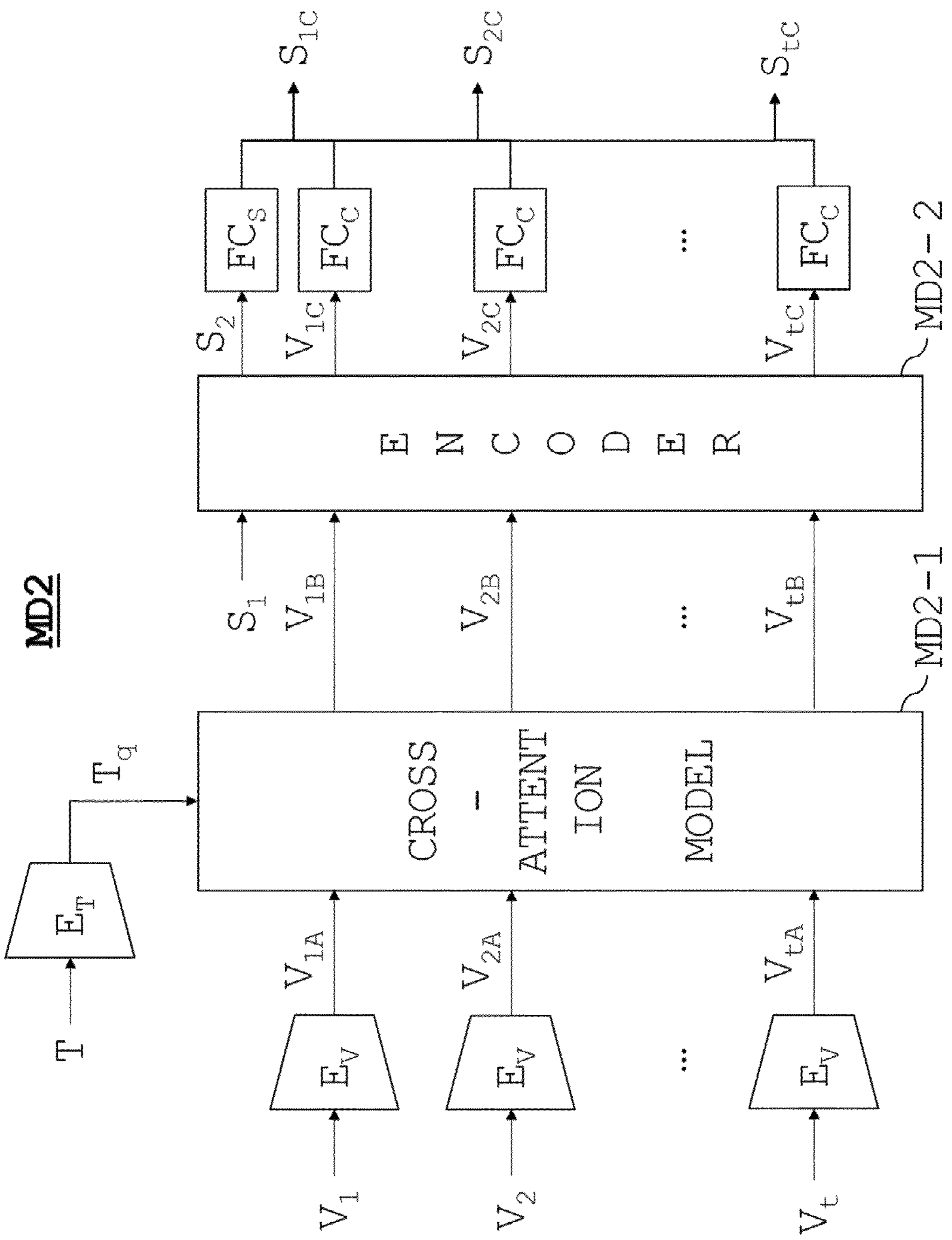
FIG. 7 is a conceptual diagram of an artificial intelligence model used in the electronic device of FIG. 5.

FIG. 7 is a conceptual diagram of the artificial intelligence model used in the electronic device of FIG. 5. First, it is referred that the video encoder $E_V$ and the text encoder $E_T$ may be fixed and thus may not be trained during the training of the artificial intelligence model MD2-4. Referring to FIG. 7, the artificial intelligence model MD2 may include the cross-attention model MD2-1 and the encoder MD2-2. The artificial intelligence model MD2 may consider the first saliency score and the second saliency score, wherein the first saliency score is greater than the second saliency score, among the plurality of saliency scores $S_{1C1}$ to $S_{tC1}$ for the plurality of time points or time periods 1 to t different from one another in the video V for the first text query $T_{q1}$. In addition, the artificial intelligence model MD2 may consider the third saliency score of the video V for the second text query $T_{q2}$. That is, the first saliency score is the saliency score of the time point or time period that is relatively more relevant to the first text query $T_{q1}$ among time points or time periods different from one another in the video V, the second saliency score is the saliency score of the time point or time period that is relatively less relevant to the first text query $T_{q1}$ among time points or time periods different from one another in the video V, and the video V and the first text query $T_{q1}$ may be positively paired. On the other hand, the third saliency score may be the saliency score for the second text query $T_{q2}$, which is negatively paired with the video V.

In an exemplary embodiment, the processor 220 may modify the artificial intelligence model MD2 so that the first saliency score increases and the second saliency score and the third saliency score decrease. For example, the processor 220 may modify the cross-attention model MD2-1, the encoder MD2-2, and the saliency token $S_1$ so that the first saliency score increases and the second saliency score and the third saliency score decrease. For example, the processor 220 may obtain a margin ranking loss of [Equation 3] by using the first saliency score and the second saliency score, and may modify the artificial intelligence model MD2 so that the first saliency score increases and the second saliency score decreases, resulting in reducing the margin ranking loss. In [Equation 3], $L_{margin}$ is the margin ranking loss, Δ is a margin, $S_{high}$ is the first saliency score, and $S_{low}$ is the second saliency score.

$$L_{margin} = \max(0, \Delta + S_{low} - S_{high}) \qquad \text{[Equation 3]}$$

In an exemplary embodiment, the processor 220 may be capable of increasing the first saliency score and decreasing the second saliency score and the third saliency score by obtaining a ranking-based (rank-aware) contrastive loss of [Equation 4] and by modifying the artificial intelligence model MD2 in order to reduce the ranking-based contrastive loss. The processor 220 may be capable of predicting accurately saliency scores by using the ranking-based contrastive loss.

$$L_{cont} = -\sum_{r=1}^{R} \log \frac{\sum_{x \in X_r^{pos}} \exp\left(\frac{S(x)}{\tau}\right)}{\sum_{x \in (X_r^{pos} \cup X_r^{neg})} \exp\left(\frac{S(x)}{\tau}\right)} \qquad \text{[Equation 4]}$$

In [Equation 4], $L_{cont}$ is the ranking-based contrastive loss, $X_r^{pos}$ means a positive set (having saliency scores greater than r), $X_r^{reg}$ means a negative set (having saliency scores less than r), τ is a temperature scaling parameter, and S(x) is a saliency score. R is a maximum ranking value, and each video clip mini-batch has a saliency score less than R. This mini-batch may be iterated R times, and at each iteration, the positive set $X_r^{pos}$ may be generated from samples with higher saliency scores than the iteration index r(r∈{0, 1, . . . , R−1}). The negative set $X_r^{neg}$ may be generated from samples with a rank lower than the iteration index r. The negative set $X_r^{neg}$ may include negative pairs used for calculating a negative loss of [Equation 5].

$$L_{neg} = -\log(1 - S_{neg}) \qquad \text{[Equation 5]}$$

In an exemplary embodiment, the processor 220 may be capable of reducing the third saliency score by obtaining the negative loss of [Equation 5] and by modifying the artificial intelligence model MD2 in order to reduce the negative loss. In [Equation 5], $L_{neg}$ is the negative loss, and $S_{neg}$ is the third saliency score, that is, the saliency score of the video-text query, which is a negative pair. By using this loss function to train the artificial intelligence model MD2, it may be possible to prevent the artificial intelligence model MD2 from obtaining a moment or saliency score regardless of whether the text query is positively or negatively paired with the video.

Figure 8:
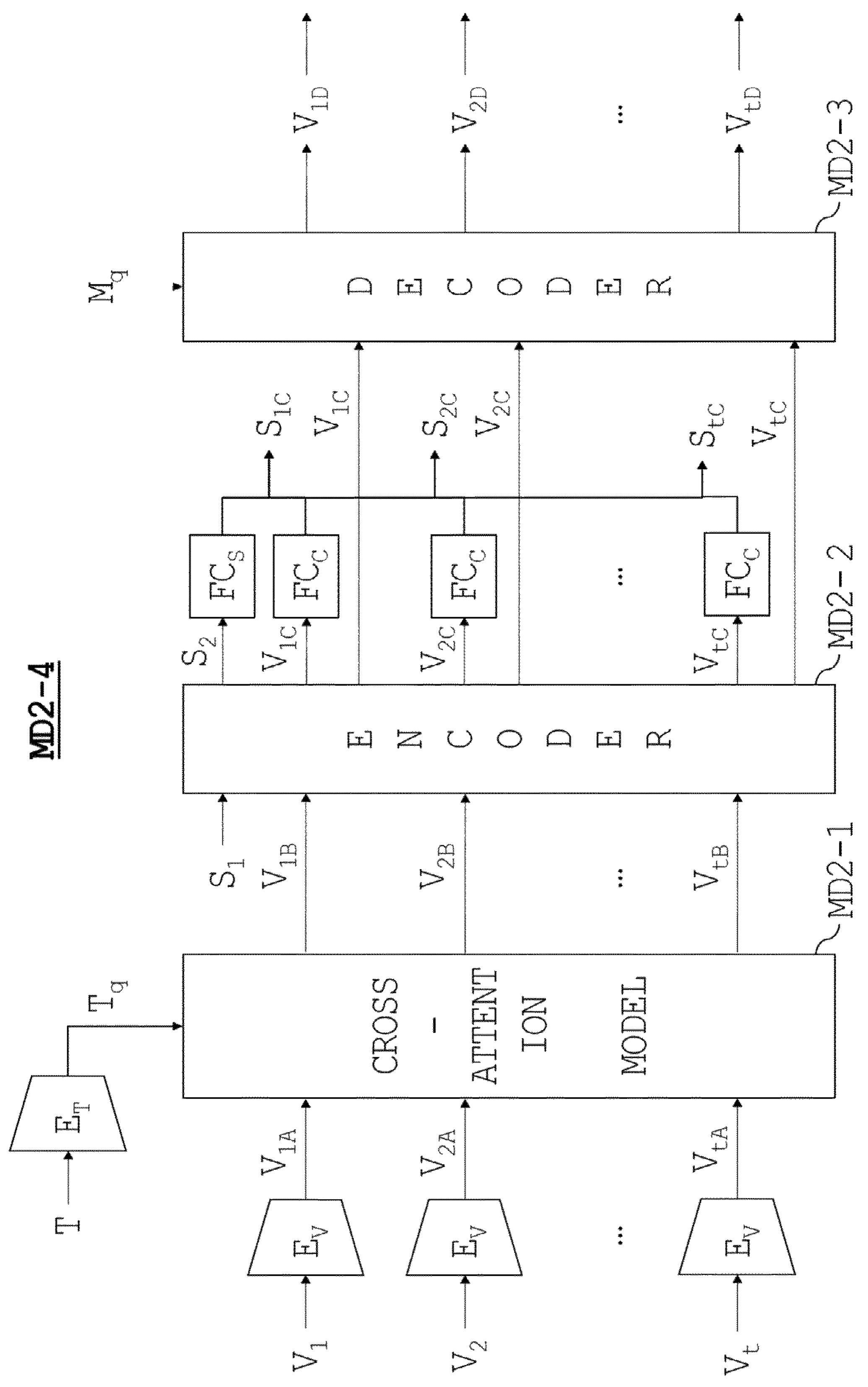
FIG. 8 is a conceptual diagram of an artificial intelligence model used in the electronic device of FIG. 5.

FIG. 8 is a conceptual diagram of the artificial intelligence model used in the electronic device of FIG. 5. Referring to FIG. 8, the processor 220 may obtain the plurality of fourth video features $V_{1D}$ to $V_{tD}$ from the plurality of third video features $V_{1C}$ to $V_{tC}$ and the time query $M_q$ by using the decoder MD2-3, and may select at least one of the plurality of time points or time periods different from one another in the video by using the plurality of fourth video features $V_{1D}$ to $V_{tD}$. That is, the processor 220 may perform a moment retrieval by using the plurality of fourth video features $V_{1D}$ to $V_{tD}$.

In an exemplary embodiment, the processor 220 may modify the cross-attention model MD2-1, the encoder MD2-2, and the decoder MD2-3 in order to reduce the difference between the selected time point or time period and the correct time point or time period. For example, the processor 220 may reduce the difference between the selected time point or time period and the correct time point or time period by obtaining a L1 loss of [Equation 6] and a gIoU loss and by reducing the L1 loss and the gIoU loss. In [Equation 6], $L_1$ is the L1 loss, m is the correct time point or time period, and $\hat{m}$ is a time point or time period selected by the processor 220. The gIoU loss may be calculated according to the definition disclosed in Hamid Rezatofighi et al., "Generalized intersection overunion: A metric and a loss for bounding box regression", in proceedings of the IEEE/CVF conference on computer vision and pattern recognition, 658-666, 2019.

$$L_1 = \|m - \hat{m}\| \quad \text{[Equation 6]}$$

In an exemplary embodiment, the processor 220 may classify whether the selected time point or time period is a foreground or a background, and modify the cross-attention model MD2-1, the encoder MD2-2, and the decoder MD2-3 so that the prediction of whether it is a foreground or a background is the same as the actual correct answer. For example, the processor 220 may modify the cross-attention model MD2-1, the encoder MD2-2, and the decoder MD2-3 in order to obtain a cross-entropy loss of [Equation 7] and to reduce the cross-entropy. In [Equation 7], $L_{CE}$ is the cross-entropy loss, y is about whether it is an actual foreground or a background, and ŷ is about whether it is a foreground or a background predicted by the processor 220.

$$L_{CE} = -\sum y \log(\hat{y}) \quad \text{[Equation 7]}$$

In an exemplary embodiment, collectively, the processor 220 may obtain a total loss of [Equation 8] and train the artificial intelligence model MD2-4 in order to reduce the loss.

$$L_{tot} = L_{hl} + L_{mr} + \lambda_{neg} L_{neg} \quad \text{[Equation 8]}$$

In [Equation 8], $L_{tot}$ is the total loss, $L_{h1}$ is a highlight detection loss, $L_{mr}$ is a moment retrieval loss, $L_{neg}$ is the negative loss (see [Equation 5]), and $\lambda_{neg}$ is a balance constant for the negative loss. The highlight detection loss $L_{h1}$ may be used to estimate the saliency score. The moment retrieval loss $L_{mr}$ may measure a difference between the actual correct time point or time period and the predicted time point or time period. For example, the highlight detection loss $L_{h1}$ and the moment retrieval loss $L_{mr}$ may be defined as in [Equation 9] and [Equation 10], respectively.

$$L_{hl} = \lambda_{margin} L_{margin} + \lambda_{cont} L_{cont} \quad \text{[Equation 9]}$$

In [Equation 9], $L_{h1}$ is the highlight detection loss, $L_{margin}$ is the margin ranking loss of [Equation 3], $\lambda_{margin}$ is a balance constant for the margin ranking loss, $L_{cont}$ is the ranking-based contrastive of [Equation 4], and $\Delta_{cont}$ is a balance constant for the ranking-based contrastive loss.

$$L_{mr} = \lambda_{L1} L_1 + \lambda_{gIoU} L_{gIoU} + \lambda_{CE} L_{CE} \quad \text{[Equation 10]}$$

In [Equation 10], $L_{mr}$ is the moment retrieval loss, $L_1$ is the $L_1$ loss of [Equation 6], $\alpha_{L1}$ is a balance constant for $L_1$ loss, $L_{gIoU}$ is the gIoU loss, and $\lambda_{gIoU}$ is a balance constant for the gIoU loss. $L_{CE}$ is the cross-entropy loss of [Equation 7], and $\Delta_{CE}$ is a balance constant for the cross-entropy loss.

Figure 9:
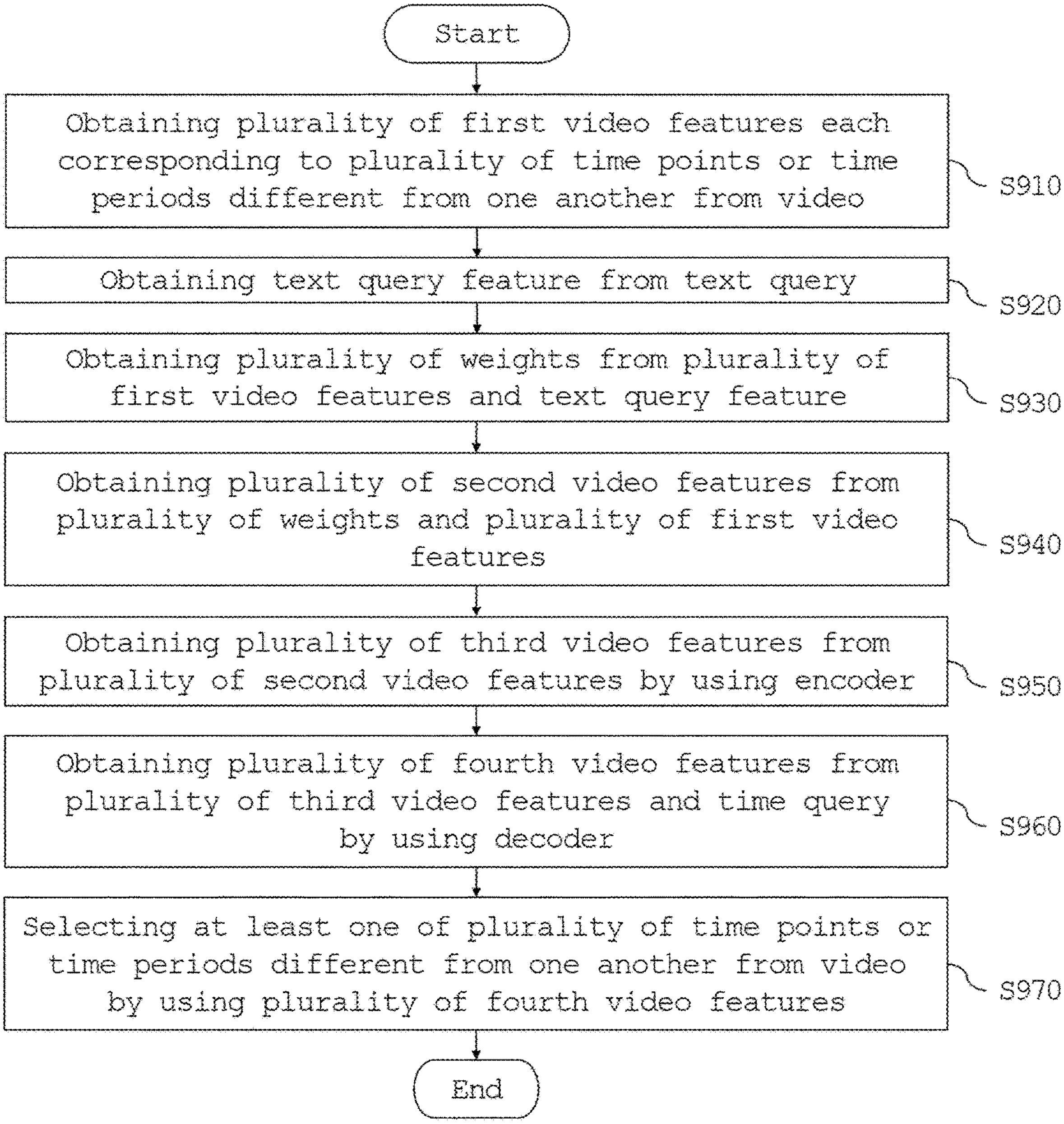
FIGS. 9 to 12 are flowcharts of a method of operating the electronic device of FIG. 1.

FIG. 9 is a flowchart of a method of operating the electronic device of FIG. 1. Referring to FIG. 9, the method of operating the electronic device may include obtaining the plurality of first video features each corresponding to the plurality of time points or time periods different from one another from the video S910, obtaining the text query feature from the text query S920, obtaining the plurality of weights from the plurality of first video features and the text query feature S930, obtaining the plurality of second video features from the plurality of weights and the plurality of first video features S940, obtaining the plurality of third video features from the plurality of second video features by using the encoder S950, obtaining the plurality of fourth video features from the plurality of third video features and the time query by using the decoder S960, and selecting at least one of the plurality of time points or time periods different from one another from the video by using the plurality of fourth video features S970. In an exemplary embodiment, the encoder may be an encoder of a transformer, and the decoder may be a decoder of a transformer. In an exemplary embodiment, the time query may include a central time point and a length that define a time period.

Figure 10:
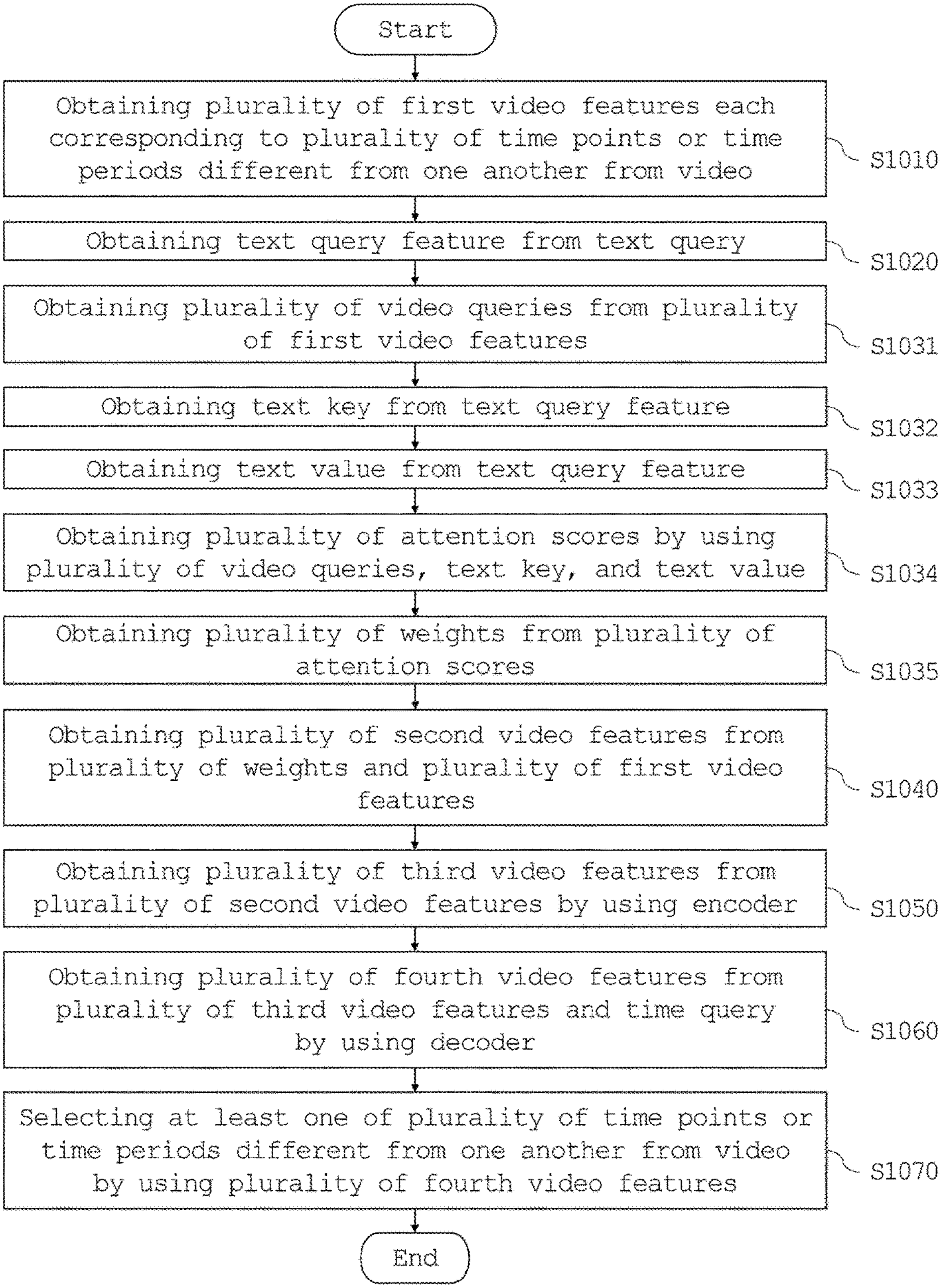

FIG. 10 is a flowchart of a method of operating the electronic device of FIG. 1. Referring to FIG. 10, the obtaining the plurality of weights S930 (see FIG. 9) may include obtaining the plurality of video queries from the plurality of first video features S1031, obtaining the text key from the text query feature S1032, obtaining the text value from the text query feature S1033, obtaining the plurality attention of scores by using the plurality of video queries, the text key, and the text value S1034, and obtaining the plurality of weights from the plurality of attention scores S1035.

That is, the method of operating the electronic device of FIG. 10 may include obtaining the plurality of first video features each corresponding to the plurality of time points or time periods different from one another from the video S1010, obtaining the text query feature from the text query S1020, obtaining the plurality of video queries from the plurality of first video features S1031, obtaining the text key from the text query feature S1032, obtaining the text value from the text query feature S1033, obtaining the plurality of attention scores by using the plurality of video queries, the text key, and the text value S1034, obtaining the plurality of weights from the plurality of attention scores S1035, obtaining the plurality of second video features from the plurality of weights and the plurality of first video feature S1040, obtaining the plurality of third video features from the plurality of second video features by using the encoder S1050, obtaining the plurality of fourth video features from the plurality of third video features and the time query by using the decoder S1060, and selecting at least one of the plurality of time points or time periods different from one another from the video by using the plurality of fourth video features S1070.

Figure 11:
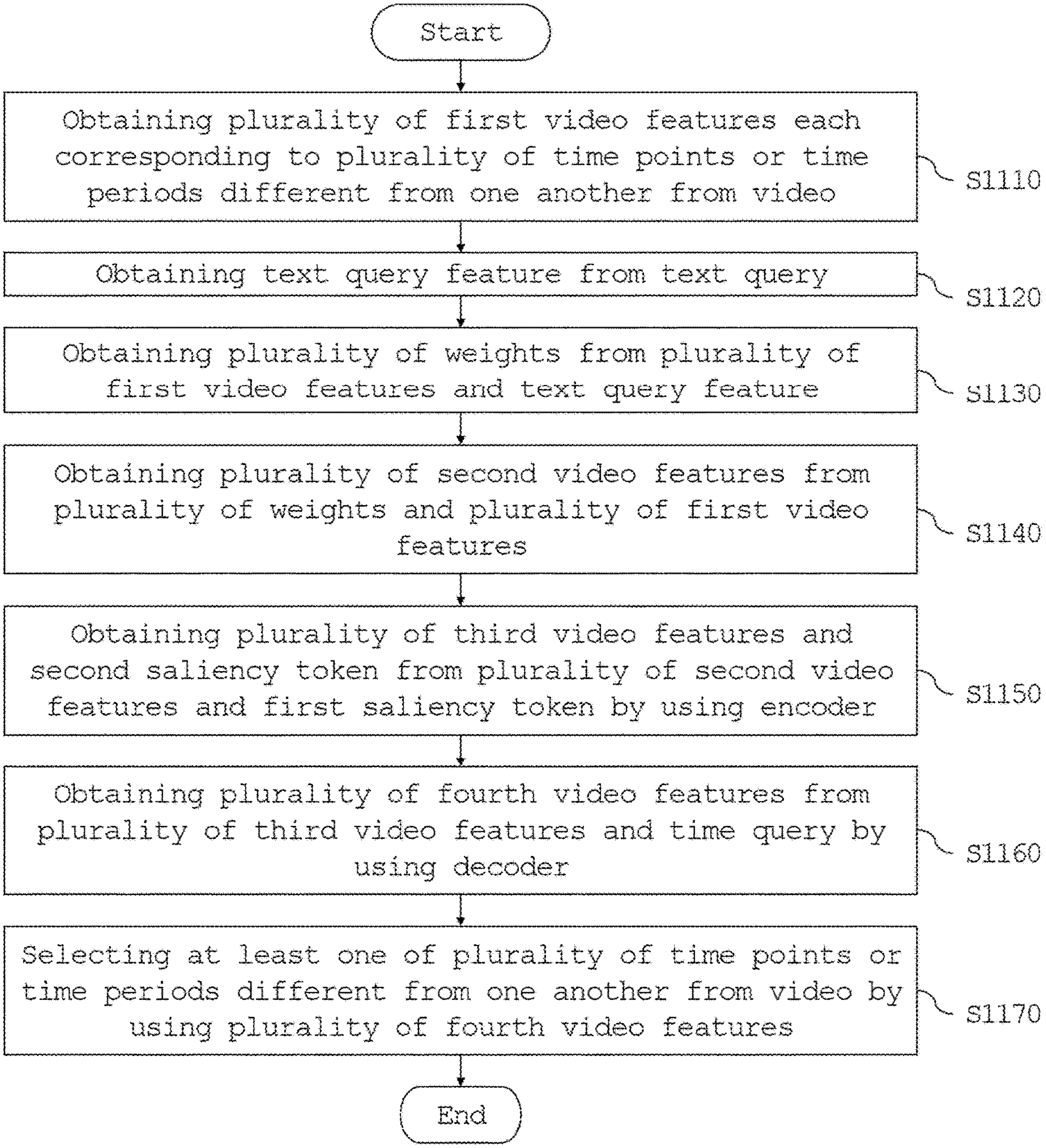

FIG. 11 is a flowchart of a method of operating the electronic device of FIG. 1. Referring to FIG. 11, the obtaining the plurality of third video features S950 (see FIG. 9) may include obtaining the plurality of third video features and the second saliency token from the plurality of second video features and the first saliency token by using the encoder S1150. That is, the method of operating the electronic device of FIG. 11 may include obtaining the plurality of first video features each corresponding to the plurality of time points or time periods different from one another from the video S1110, obtaining the text query feature from the text query S1120, obtaining the plurality of weights from the plurality of first video features and the text query feature S1130, obtaining the plurality of second video features from the plurality of weights and the plurality of first video feature S1140, obtaining the plurality of third video features and the second saliency token from the plurality of second video features and the first saliency token by using the encoder S1150, obtaining the plurality of fourth video features from the plurality of third video features and the time query by using the decoder S1160, and selecting at least one of the plurality of time points or time periods different from one another from the video by using the plurality of fourth video features S1170.

Figure 12:
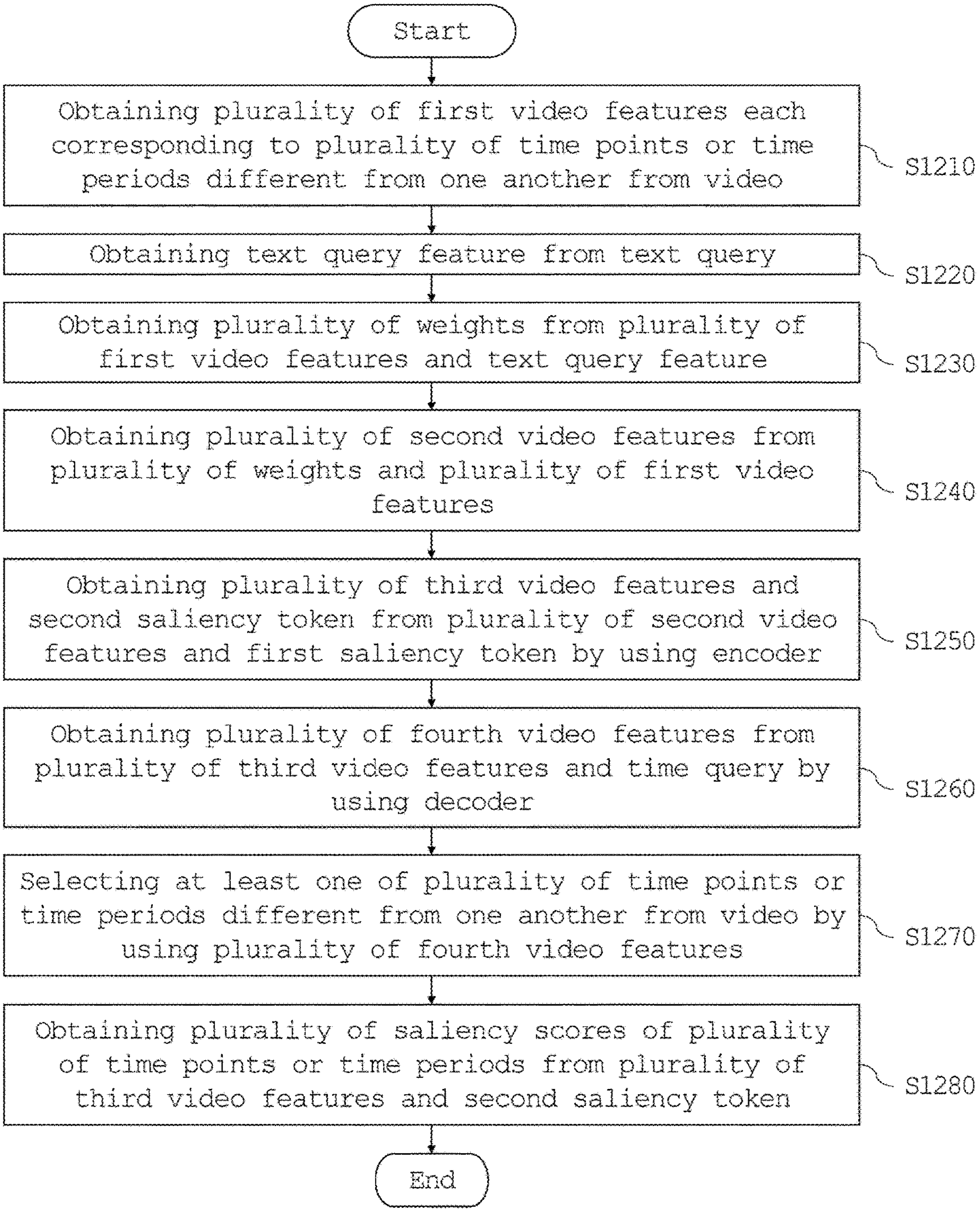

FIG. 12 is a flowchart of a method of operating the electronic device of FIG. 1. Referring to FIG. 12, the method of operating the electronic device may further include obtaining the plurality of saliency scores of the plurality of time points or time periods different from one another from the plurality of third video features and the second saliency token S1280. That is, the method of operating the electronic device of FIG. 12 may include obtaining the plurality of first video features each corresponding to the plurality of time points or time periods different from one another from the video S1210, obtaining the text query feature from the text query S1220, obtaining the plurality of weights from the plurality of first video features and the text query feature S1230, obtaining the plurality of second video features from the plurality of weights and the plurality of first video features S1240, obtaining the plurality of third video features and the second saliency token from the plurality of second video features and the first saliency token by using the encoder S1250, obtaining the plurality of fourth video features from the plurality of third video features and the time query by using the decoder S1260, selecting at least one of the plurality of time points or time periods different from one another from the video by using the plurality of fourth video features S1270, and obtaining the plurality of saliency scores of the plurality of time points or time periods different from one another from the plurality of third video features and the second saliency token S1280.

Figure 13:
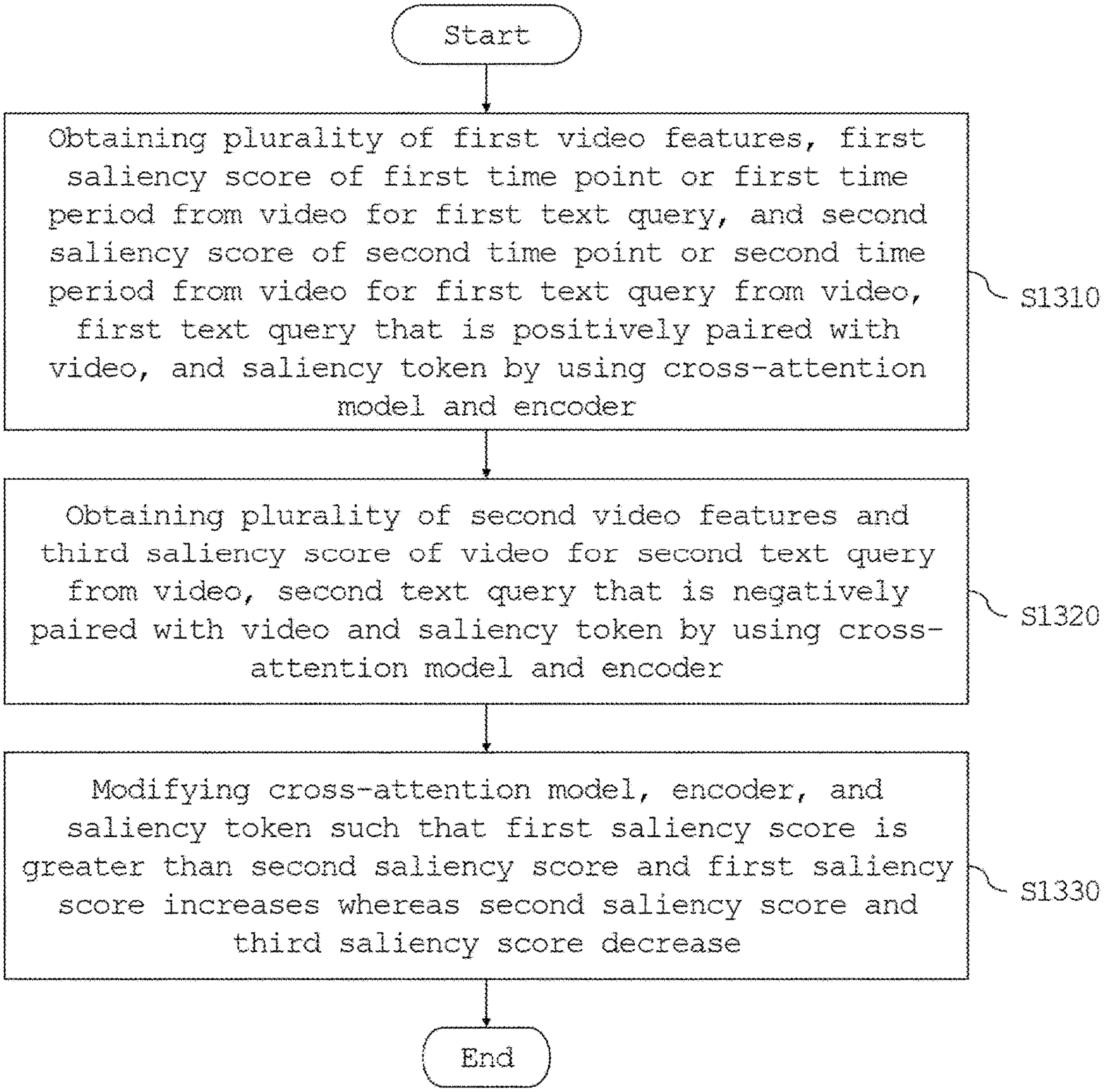
FIGS. 13 to 16 are flowcharts of a method of operating the electronic device of FIG. 5.

FIG. 13 is a flowchart of a method of operating the electronic device of FIG. 5. Referring to FIG. 13, the method of operating the electronic device may include obtaining the plurality of first video features, the first saliency score of the first time point or the first time period in the video for the first text query, and the second saliency score of the second time point or the second time period in the video for the first text query from the video, the first text query that is positively paired with the video, and the saliency token by using the cross-attention model and the encoder S1310, obtaining the plurality of second video features and the third saliency score of the video for the second text query from the video, the second text query that is negatively paired with the video and the saliency token by using the cross-attention model and the encoder S1320, and modifying the cross-attention model, the encoder, and the saliency token such that the first saliency score is greater than the second saliency score and the first saliency score increases whereas the second saliency score and the third saliency score decrease S1330.

Figure 14:
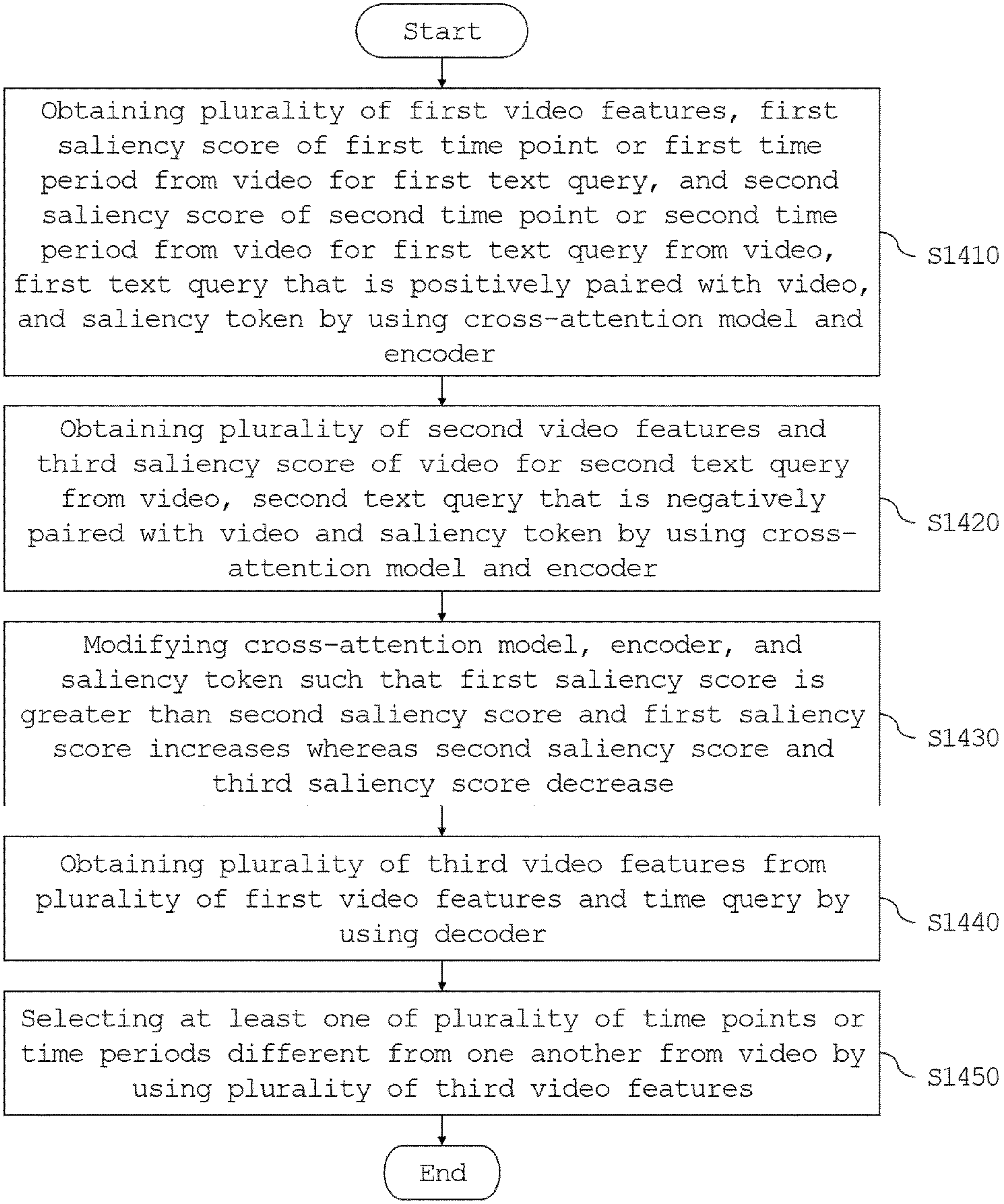

FIG. 14 is a flowchart of a method of operating the electronic device of FIG. 5. Referring to FIG. 14, the method of operating the electronic device may further include obtaining the plurality of third video features from the plurality of first video features and the time query by using the decoder S1440, and selecting at least one of the plurality of time points or time periods different from one another in the video by using the plurality of third video features S1450. That is, the method of operating the electronic device of FIG. 14 may include obtaining the plurality of first video features, the first saliency score of the first time point or the first time period in the video for the first text query, and the second saliency score of the second time point or the second time period in the video for the first text query from the video, the first text query that is positively paired with the video, and the saliency token by using the cross-attention model and the encoder S1410, obtaining the plurality of second video features and the third saliency score of the video for the second text query from the video, the second text query that is negatively paired with the video and the saliency token by using the cross-attention model and the encoder S1420, modifying the cross-attention model, the encoder, and the saliency token such that the first saliency score is greater than the second saliency score and the first saliency score increases whereas the second saliency score and the third saliency score decrease S1430, obtaining the plurality of third video features from the plurality of first video features and the time query by using the decoder S1440, and selecting at least one of the plurality of time points or time periods different from one another in the video by using the plurality of third video features S1450.

Figure 15:
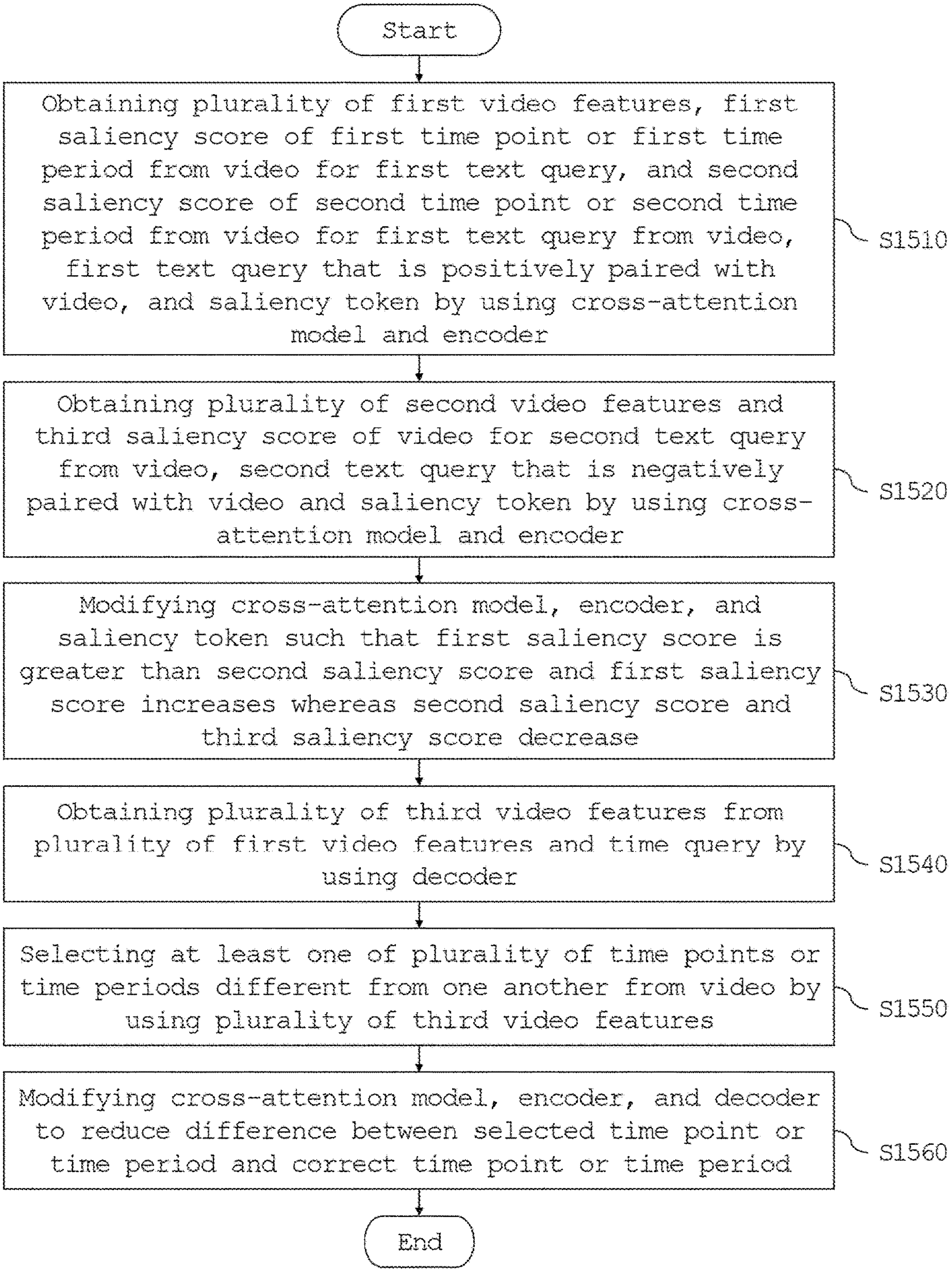

FIG. 15 is a flowchart of a method of operating the electronic device of FIG. 5. Referring to FIG. 15, the method of operating the electronic device may further include modifying the cross-attention model, the encoder, and the decoder in order to reduce the difference between the selected time point or time period and the correct time point or time period S1560. That is, the method of operating the electronic device of FIG. 15 may include obtaining the plurality of first video features, the first saliency score of the first time point or the first time period in the video for the first text query, and the second saliency score of the second time point or the second time period in the video for the first text query from the video, the first text query that is positively paired with the video, and the saliency token by using the cross-attention model and the encoder S1510, obtaining the plurality of second video features and the third saliency score of the video for the second text query from the video, the second text query that is negatively paired with the video and the saliency token by using the cross-attention model and the encoder S1520, modifying the cross-attention model, the encoder, and the saliency token such that the first saliency score is greater than the second saliency score and the first saliency score increases whereas the second saliency score and the third saliency score decrease S1530, obtaining the plurality of third video features from the plurality of first video features and the time query by using the decoder S1540, selecting at least one of the plurality of time points or time periods different from one another in the video by using the plurality of third video features S1550, and modifying the cross-attention model, the encoder, and the decoder to reduce the difference between the selected time point or time period and the correct time point or time period S1560.

Figure 16:
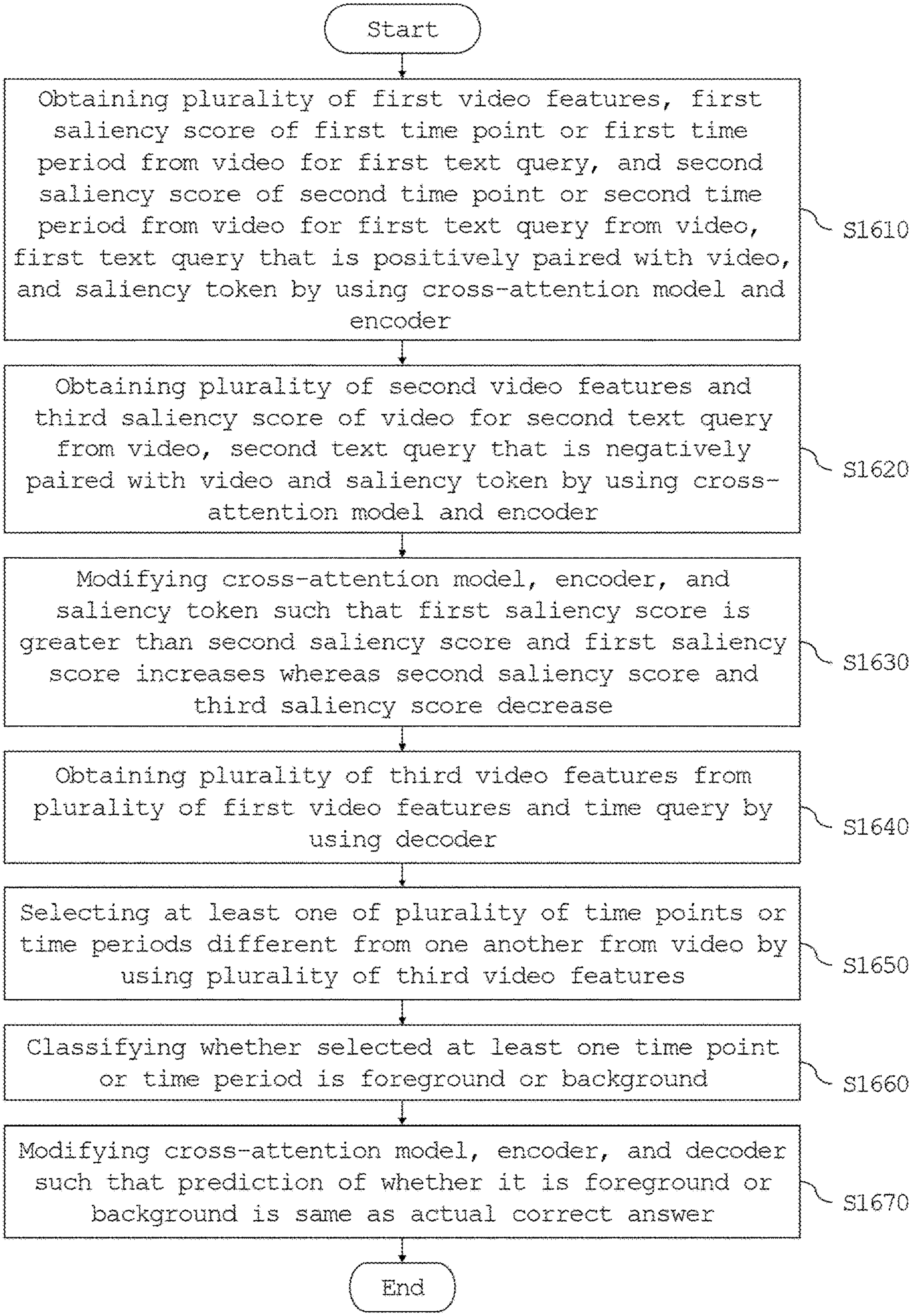

FIG. 16 is a flowchart of a method of operating the electronic device of FIG. 5. Referring to FIG. 16, the method of operating the electronic device may further include classifying whether the selected at least one time point or time period is a foreground or a background S1660, and modifying the cross-attention model, the encoder, and the decoder so that the prediction of whether it is a foreground or a background is the same as the actual correct answer S1670. That is, the method of operating the electronic device in FIG. 16 may include obtaining the plurality of first video features, the first saliency score of the first time point or the first time period in the video for the first text query, and the second saliency score of the second time point or the second time period in the video for the first text query from the video, the first text query that is positively paired with the video, and the saliency token by using the cross-attention model and the encoder S1610, obtaining the plurality of second video features and the third saliency score of the video for the second text query from the video, the second text query that is negatively paired with the video and the saliency token by using the cross-attention model and the encoder S1620, modifying the cross-attention model, the encoder, and the saliency token such that the first saliency score is greater than the second saliency score and the first saliency score increases whereas the second saliency score and the third saliency score decrease S1630, obtaining the plurality of third video features from the plurality of first video features and the time query by using the decoder S1640, selecting at least one of the plurality of time points or time periods different from one another in the video by using the plurality of third video features S1650, classifying whether the selected at least one time point or time period is a foreground or a background S1660, and modifying the cross-attention model, the encoder, and the decoder so that the prediction of whether it is a foreground or a background is the same as the actual correct answer S1670.

EXEMPLARY EMBODIMENTS AND COMPARATIVE EMBODIMENTS

1st exemplary embodiment: Using video features

2nd exemplary embodiment: Using video features and audio features

3rd exemplary embodiment: Using video features extracted by using VGG

4th exemplary embodiment: Using video features extracted by using VGG+audio features 5th exemplary embodiment: Using video features extracted by using C3D 6th exemplary embodiment: Using video features extracted by using Slowfast and CLIP 7th exemplary embodiment: including four self-attention layers instead of cross-attention model 8th exemplary embodiment: the cross-attention model includes four cross-attention layers 1st comparative embodiment: BeautyThumb (Yale Song et al., "To click or not to click: Automatic selection of beautiful thumbnails from videos", in proceedings of the 25th ACM international on conference on information and knowledge management, 659-668, 2016)

2nd comparative embodiment: DVSE (Wu Liu et al., "Multi-task deep visual-semantic embedding for video thumbnail selection", in proceedings of the IEEE conference on computer vision and pattern recognition, 3707-3715, 2015)

3rd comparative embodiment: MCN (Lisa Anne Hendricks et al., "localizing moments in video with natural language", in proceedings of the IEEE international conference on computer vision, 5803-5812, 2017)

4th comparative embodiment: CAL (Victor Escorcia et al., "Temporal localization of moments in video collections with natural language", arXiv 2019)

5th comparative embodiment: XML (Jie Lei et al., "Tvr: A large-scale dataset for video-subtitle moment retrieval", In European Conference on Computer Vision, 447-463, 2020)

6th comparative embodiment: XML+(Jie Lei et al., "Tvr: A large-scale dataset for video-subtitle moment retrieval", In European Conference on Computer Vision, 447-463, 2020)

7th comparative embodiment: Moment-DETR (Jie Lei et al., "Detecting moments and highlights in videos via natural language queries", Advances in Neural Information Processing Systems, 34:11846-11858, 2021)

8th comparative embodiment: UMT (Ye Liu et al., "Umt: Unified multi-modal transformers for joint video moment retrieval and highlight detection", in proceedings of the IEEE/CVF Conference on Computer Vision and Pattern Recognition, 3042-3051, 2022)

9th comparative embodiment: sLSTM (Ke Zhang et al., "Video summarization with long short-term memory", In European conference on computer vision, 766-782, 2016)

10th comparative embodiment: SG (Behrooz Mahasseni et al., "Unsupervised video summarization with adversarial lstm networks", in proceedings of the IEEE conference on computer Vision and Pattern Recognition, 202-211, 2017)

11th comparative embodiment: LIM-S(Bo Xiong et al., "Less is more: Learning highlight detection from video duration", in proceedings of the IEEE/CVF conference on computer vision and pattern recognition, 1258-1267, 2019)

12th comparative embodiment: Trailer (Lezi Wang et al., "Learning trailer moments in full-length movies with co-contrastive attention", In European Conference on Computer Vision, 300-316, 2020)

13th comparative embodiment: SL-Module (Minghao Xu et al., "Cross-category video highlight detection via set-based learning", in proceedings of the IEEE/CVF International Conference on Computer Vision, 7970-7979, 2021)

14th comparative embodiment: MINI-NET (Fa-Ting Hong et al., "Mini-net: Multiple instance ranking network for video highlight detection", In European Conference on Computer Vision, 345-360, 2020)

15th comparative embodiment: TCG (Qinghao Ye et al., "Temporal cue guided video highlight detection with low-rank audio-visual fusion", in proceedings of the IEEE/CVF International Conference on Computer Vision, 7950-7959, 2021)

16th comparative embodiment: Joint-VA (Taivanbat Badamdorj et al., "Joint visual and audio learning for video highlight detection", in proceedings of the IEEE/CVF International Conference on Computer Vision, 8127-8137, 2021)

17th comparative embodiment: SAP

18th comparative embodiment: TripNet

19th comparative embodiment: SM-RL

20th comparative embodiment: MAN

21st comparative embodiment: 2D_TAN

22nd comparative embodiment: FVMR

23rd comparative embodiment: CTRL

24th comparative embodiment: ACL

25th comparative embodiment: RWM-RL

26th comparative embodiment: DEBUG

27th comparative embodiment: VSLNet

Figure 17:
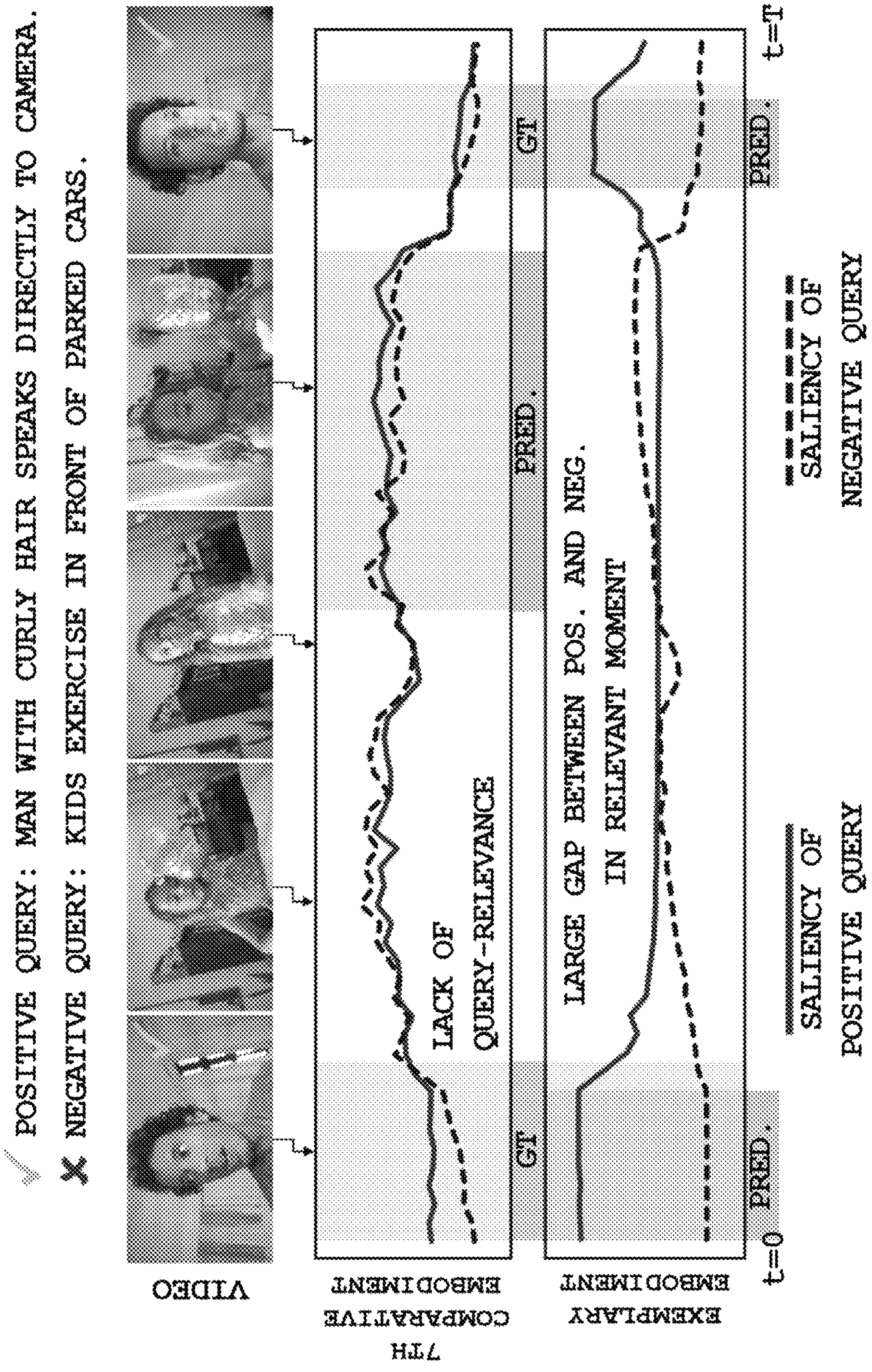
FIG. 17 shows results of moment retrieval and highlight detection of a video according to a relevance (positive pair: relevant, negative pair: irrelevant) of a text query of an exemplary embodiment of the present disclosure and a comparative embodiment.

FIG. 17 shows results of moment retrieval and highlight detection of a video according to a relevance (positive pair: relevant, negative pair: irrelevant) of a text query of an exemplary embodiment of the present disclosure and a comparative embodiment. Referring to FIG. 17, in the case of the 7th comparative embodiment, the result of the saliency score prediction was the same regardless of whether the text query was a positive pair or a negative pair. That is, in the case of the 7th comparative embodiment, the impact of the text query on the video moment retrieval and highlight detection was insignificant, and a part that was completely far from the actual correct answer was selected. On the other hand, according to an exemplary embodiment of the present disclosure, the saliency score was greatly different depending on whether the text query was a positive pair or a negative pair, and the selected moment was close to the actual correct answer moment. According to an exemplary embodiment of the present disclosure, this is because video features become dependent on the text query through the cross-attention between text query and video and the training with the negative pairs.

TABLE 1

| | | MR | | | | | HD | |
|---|---|---|---|---|---|---|---|---|
| | | R1 | | mAP | | | >=Very Good | |
| Method | Input | @0.5 | @0.7 | @0.5 | @0.75 | Avg. | mAP | HIT @1 |
| 1st comparative embodiment | V | — | — | — | — | — | 14.36 | 20.88 |
| 2nd comparative embodiment | V | — | — | — | — | — | 18.75 | 21.79 |
| 3rd comparative embodiment | V | 11.41 | 2.72 | 24.94 | 8.22 | 10.67 | — | — |
| 4th comparative embodiment | V | 25.49 | 11.54 | 23.40 | 7.65 | 9.89 | — | — |
| 5th comparative embodiment | V | 41.83 | 30.35 | 44.63 | 31.73 | 32.14 | 34.49 | 55.25 |
| 6th comparative embodiment | V | 46.69 | 33.46 | 47.89 | 34.67 | 34.90 | 35.38 | 55.06 |
| 7th comparative embodiment | V | 52.89 ± 2.3 | 33.02 ± 1.7 | 54.82 ± 1.7 | 29.40 ± 1.7 | 30.73 ± 1.4 | 35.69 ± 0.5 | 55.60 ± 1.6 |
| 1st exemplary embodiment | V | 62.40 ± 1.1 | 44.98 ± 0.8 | 62.52 ± 0.6 | 39.88 ± 0.7 | 39.86 ± 0.6 | 38.94 ± 0.4 | 62.40 ± 1.4 |
| 8th comparative embodiment | V + A | 56.23 | 41.18 | 53.38 | 37.01 | 36.12 | 38.18 | 59.99 |
| 2nd exemplary embodiment | V + A | 63.06 ± 1.0 | 45.10 ± 0.7 | 63.04 ± 0.9 | 40.10 ± 1.0 | 40.19 ± 0.6 | 39.04 ± 0.3 | 62.87 ± 0.6 |

Table 1 compares the performance of the comparative embodiments with that of the exemplary embodiments on the moment retrieval and highlight detection task by using the dataset of QVHighlights (Jie Lei et al., "Detecting moments and highlights in videos via natural language queries", Advances in Neural Information Processing Systems, 34:11846-11858, 2021). Referring to Table 1, the exemplary embodiments of the present disclosure showed higher performance than the comparative embodiments. In addition, it may be seen that the performance is improved by inputting not only audio but also video in light of the fact that the performance of the second exemplary embodiment is higher than that of the first exemplary embodiment in the exemplary embodiments of the present disclosure.

TABLE 2

| Method | Input | VT | VU | GA | MS | PK | PR | FM | BK | BT | DS | Avg. |
|---|---|---|---|---|---|---|---|---|---|---|---|---|
| 9th comparative embodiment | V | 41.1 | 46.2 | 46.3 | 47.7 | 44.8 | 46.1 | 45.2 | 40.6 | 47.1 | 45.5 | 45.1 |
| 10th comparative embodiment | V | 42.3 | 47.2 | 47.5 | 48.9 | 45.6 | 47.3 | 46.4 | 41.7 | 48.3 | 46.6 | 46.2 |
| 11th comparative embodiment | V | 55.9 | 42.9 | 61.2 | 54.0 | 60.3 | 47.5 | 43.2 | 66.3 | 69.1 | 62.6 | 56.3 |
| 12th comparative embodiment | V | 61.3 | 54.6 | 65.7 | 60.8 | 59.1 | 70.1 | 58.2 | 64.7 | 65.6 | 68.1 | 62.8 |
| 13th comparative embodiment | V | 86.5 | 68.7 | 74.9 | 86.2 | 79.0 | 63.2 | 58.9 | 72.6 | 78.9 | 64.0 | 73.3 |
| 1st exemplary embodiment | V | 88.2 | 87.4 | 85.6 | 85.0 | 85.8 | 86.9 | 76.4 | 91.3 | 89.2 | 73.7 | 85.0 |
| 14th comparative embodiment | V + A | 80.6 | 68.3 | 78.2 | 81.8 | 78.1 | 65.8 | 57.8 | 75.0 | 80.2 | 65.5 | 73.2 |

TABLE 2-continued

| Method | Input | VT | VU | GA | MS | PK | PR | FM | BK | BT | DS | Avg. |
|---|---|---|---|---|---|---|---|---|---|---|---|---|
| $15^{th}$ comparative embodiment | V + A | 85.0 | 71.4 | 81.9 | 78.6 | 80.2 | 75.5 | 71.6 | 77.3 | 78.6 | 68.1 | 76.8 |
| $16^{th}$ comparative embodiment | V + A | 83.7 | 57.3 | 78.5 | 86.1 | 80.1 | 69.2 | 70.0 | 73.0 | 97.4 | 67.5 | 76.3 |
| $8^{th}$ comparative embodiment | V + A | 87.5 | 81.5 | 88.2 | 78.8 | 81.4 | 87.0 | 76.0 | 86.9 | 84.4 | 79.6 | 83.1 |
| $2^{nd}$ exemplary embodiment | V + A | 87.6 | 91.7 | 90.2 | 88.3 | 84.1 | 88.3 | 78.7 | 91.2 | 87.8 | 77.7 | 86.6 |

Table 2 compares the performance of the comparative embodiments with that of the exemplary embodiments on highlight detection task by using the datasets of TVsum (Yale song et al., "TVsum: Summarizing web videos using titles", in proceedings of the IEEE conference on computer vision and pattern recognition, 5179-5187, 2015). Referring to Table 2, the exemplary embodiments of the present disclosure showed higher performance than the comparative embodiments.

TABLE 3

| Method | Features | R1@0.5 | R1@0.7 |
|---|---|---|---|
| $17^{th}$ comparative embodiment | VGG | 27.42 | 13.36 |
| $18^{th}$ comparative embodiment | VGG | 36.61 | 14.50 |
| $19^{th}$ comparative embodiment | VGG | 24.36 | 11.17 |
| $20^{th}$ comparative embodiment | VGG | 41.24 | 20.54 |
| $21^{th}$ comparative embodiment | VGG | 40.94 | 22.85 |
| $22^{th}$ comparative embodiment | VGG | 42.36 | 24.14 |
| $8^{th}$ comparative embodiment | VGG | 48.31 | 29.25 |
| $3^{rd}$ exemplary embodiment | VGG | 52.77 | 31.13 |
| $4^{th}$ exemplary embodiment | VGG | 55.51 | 34.17 |

TABLE 3-continued

| Method | Features | R1@0.5 | R1@0.7 |
|---|---|---|---|
| $23^{th}$ comparative embodiment | C3D | 23.63 | 8.89 |
| $24^{th}$ comparative embodiment | C3D | 30.48 | 12.20 |
| $25^{th}$ comparative embodiment | C3D | 36.70 | — |
| $20^{th}$ comparative embodiment | C3D | 46.53 | 22.72 |
| $26^{th}$ comparative embodiment | C3D | 37.39 | 17.69 |
| $27^{th}$ comparative embodiment | C3D | 47.31 | 30.19 |
| $5^{th}$ exemplary embodiment | C3D | 50.67 | 31.02 |
| $7^{th}$ comparative embodiment | SF + C | 53.63 | 31.37 |
| $6^{th}$ exemplary embodiment | SF + C | 57.31 | 32.55 |

Table 3 compares the performance of the comparative embodiments with that of the exemplary embodiments on a moment retrieval task by using the dataset of Charades-STA (Jiyang Gao et al. "Tall: Temporal Activity Localization via language query", in proceedings of the IEEE international conference on computer vision, 5267-5275, 2017). Referring to Table 3, the exemplary embodiments of the present disclosure showed higher performance than the comparative embodiments.

TABLE 4

| | Cross attention model | Negative Pair loss | Saliency Token | Time query | MR R1 @0.5 | MR R1 @0.7 | MR mAP @0.5 | MR mAP @0.75 | MR mAP Avg. | HD >=Very Good mAP | HD >=Very Good HIT @1 |
|---|---|---|---|---|---|---|---|---|---|---|---|
| exemplary embodiment (a) | | | | | 52.89 | 33.02 | 54.82 | 29.40 | 30.73 | 35.69 | 55.60 |
| exemplary embodiment (b) | V | | | | 56.16 | 38.71 | 56.48 | 33.42 | 34.07 | 37.14 | 58.34 |
| exemplary embodiment (c) | | V | | | 58.69 | 39.83 | 58.39 | 34.84 | 35.40 | 39.02 | 62.81 |

TABLE 4-continued

| | Cross attention model | Negative Pair loss | Saliency Token | Time query | MR R1 @0.5 | MR R1 @0.7 | MR mAP @0.5 | MR mAP @0.75 | MR mAP Avg. | HD >=Very Good mAP | HD >=Very Good HIT @1 |
|---|---|---|---|---|---|---|---|---|---|---|---|
| exemplary embodiment (d) | | | V | | 55.48 | 37.00 | 55.81 | 26.75 | 32.84 | 37.48 | 58.59 |
| exemplary embodiment (e) | | | | V | 53.19 | 35.91 | 55.58 | 32.55 | 33.33 | 35.68 | 55.56 |
| exemplary embodiment (f) | V | | | V | 57.72 | 42.35 | 59.10 | 38.16 | 38.03 | 36.56 | 57.44 |
| exemplary embodiment (g) | V | V | | | 59.57 | 42.12 | 59.19 | 36.63 | 36.76 | 38.64 | 61.62 |
| exemplary embodiment (h) | | V | V | | 60.00 | 40.97 | 59.21 | 35.41 | 35.89 | 39.06 | 62.88 |
| exemplary embodiment (i) | V | V | V | | 60.32 | 42.39 | 59.47 | 36.79 | 36.93 | 39.21 | 62.76 |
| exemplary embodiment (j) | V | V | V | V | 62.68 | 46.66 | 62.23 | 41.82 | 41.22 | 39.13 | 63.03 |

Table 4 shows the results of experiments to investigate the effectiveness of each configuration of the present disclosure. MR refers to the performance of moment retrieval, and HD refers to the performance of highlight detection. Referring to Table 4, the exemplary embodiment (e) improved only the performance of moment retrieval compared to the exemplary embodiment (a), and this is because the time query affects only the decoder. On the other hand, the exemplary embodiments (b), (*c*), and (*d*) improved both the performance of moment retrieval and the performance of highlight detection compared to the exemplary embodiment (a). This is because the cross-attention model, the negative pair loss, and the saliency token can commonly obtain a text query-dependent video representation.

Figure 18:
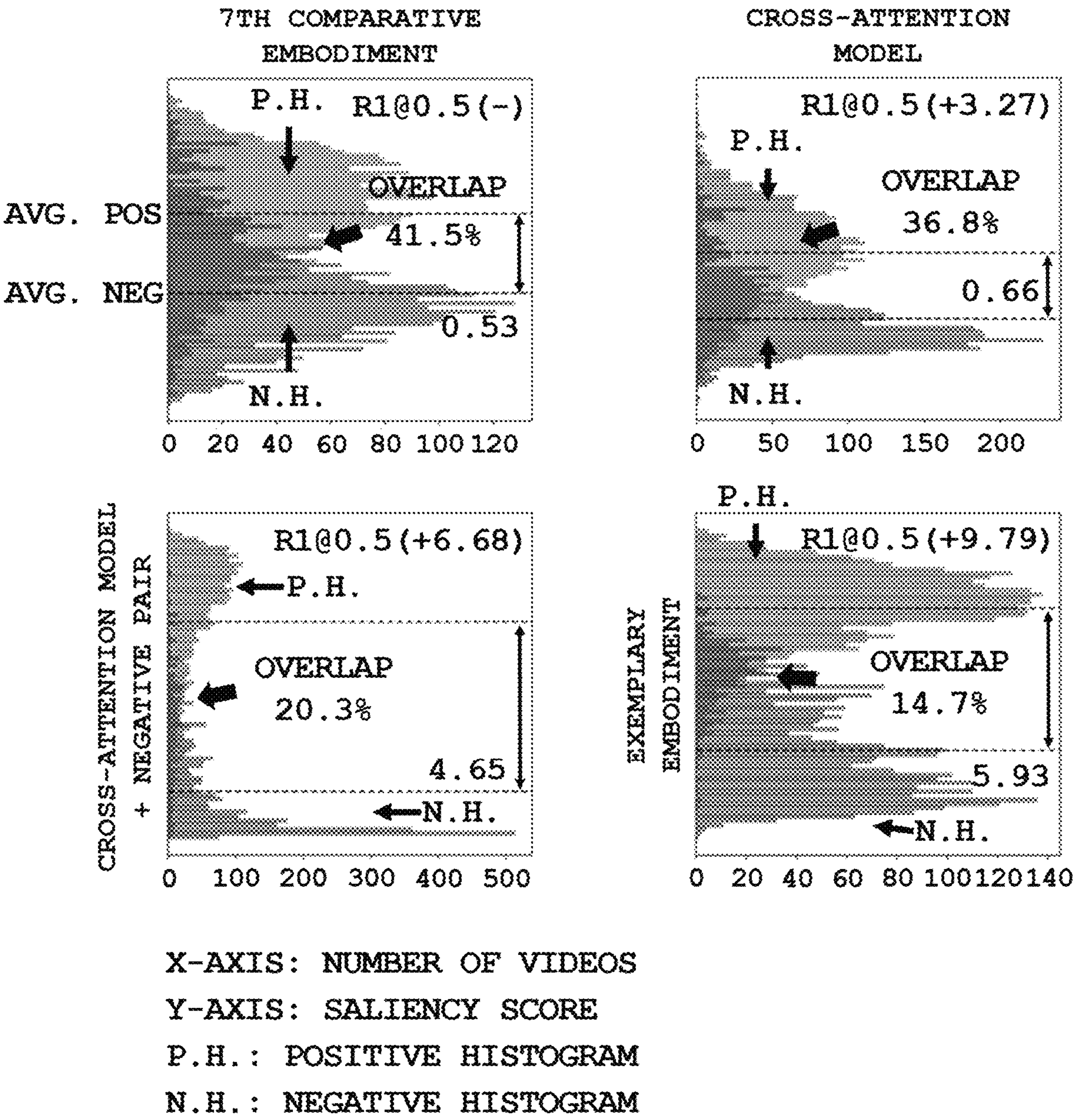
FIG. 18 shows results for confirming an impact of configurations of an exemplary embodiment of the present disclosure on a saliency score.

FIG. 18 shows results for confirming an impact of configurations of an exemplary embodiment of the present disclosure on a saliency score. Referring to FIG. 18, the positive pair graph and the negative pair graph overlapped to a significant extent in the 7th comparative embodiment. That is, the text query has a small impact on the output in the 7th comparative embodiment. Meanwhile, the overlap between the positive pair graph and the negative pair graph is significantly reduced in the exemplary embodiment such that the text query has a significant impact on the output.

TABLE 5

| T2V | MR R1 @0.5 | MR R1 @0.7 | MR mAP @0.5 | MR mAP @0.75 | MR mAP Avg. | HD >=Very Good mAP | HD >=Very Good HIT@1 |
|---|---|---|---|---|---|---|---|
| $7^{th}$ comparative embodiment (self-attention 2) | 52.89 ± 2.3 | 33.02 ± 1.7 | 54.82 ± 1.7 | 29.40 ± 1.7 | 30.73 ± 1.4 | 35.69 ± 0.5 | 55.60 ± 1.6 |
| $7^{th}$ comparative embodiment (self-attention 4) | 53.60 ± 1.2 | 35.81 ± 0.9 | 54.55 ± 0.8 | 30.64 ± 0.7 | 31.74 ± 0.4 | 35.96 ± 0.2 | 56.56 ± 0.9 |
| $7^{th}$ comparative embodiment (cross-attention 4) | 55.10 ± 0.7 | 37.02 ± 0.9 | 56.21 ± 0.3 | 32.00 ± 0.9 | 33.19 ± 0.6 | 36.43 ± 0.3 | 56.98 ± 0.6 |
| $7^{th}$ comparative embodiment* (cross-attention 4) | 56.16 ± 1.2 | 38.71 ± 1.1 | 56.48 ± 0.8 | 33.42 ± 0.7 | 34.07 ± 0.6 | 37.14 ± 0.4 | 58.34 ± 0.4 |
| $7^{th}$ exemplary embodiment* (self-attention 4) | 60.48 ± 0.7 | 45.21 ± 1.0 | 60.84 ± 0.5 | 40.45 ± 0.7 | 40.12 ± 0.6 | 38.66 ± 0.2 | 61.29 ± 1.0 |

TABLE 5-continued

| | MR | | | | | HD | |
|---|---|---|---|---|---|---|---|
| | R1 | | mAP | | | >=Very Good | |
| T2V | @0.5 | @0.7 | @0.5 | @0.75 | Avg. | mAP | HIT@1 |
| 8th exemplary embodiment* (cross-attention 4) | 62.68 ± 1.1 | 46.66 ± 0.6 | 62.23 ± 1.0 | 41.82 ± 0.9 | 41.22 ± 0.4 | 39.13 ± 0.3 | 63.03 ± 0.5 |

Table 5 shows the results of an experiment to address concerns that exemplary embodiments of the present disclosure may outperform comparative embodiment due to the effect of increasing the number of model parameters by adding cross-attention. * may indicate that only text query features are used as encoder conditions and only video features are processed by the decoder. Referring to Table 5, the cross-attention showed better performance than the same number of self-attention in the comparative embodiment. In addition, when comparing the 7th exemplary embodiment and 8th exemplary embodiment, cross-attention also showed better performance than the same number of self-attention. Therefore, it may be seen that the exemplary embodiments of the present disclosure show excellent performance not due to the increase in the number of parameters but due to the nature of the cross-attention.

Figure 19:
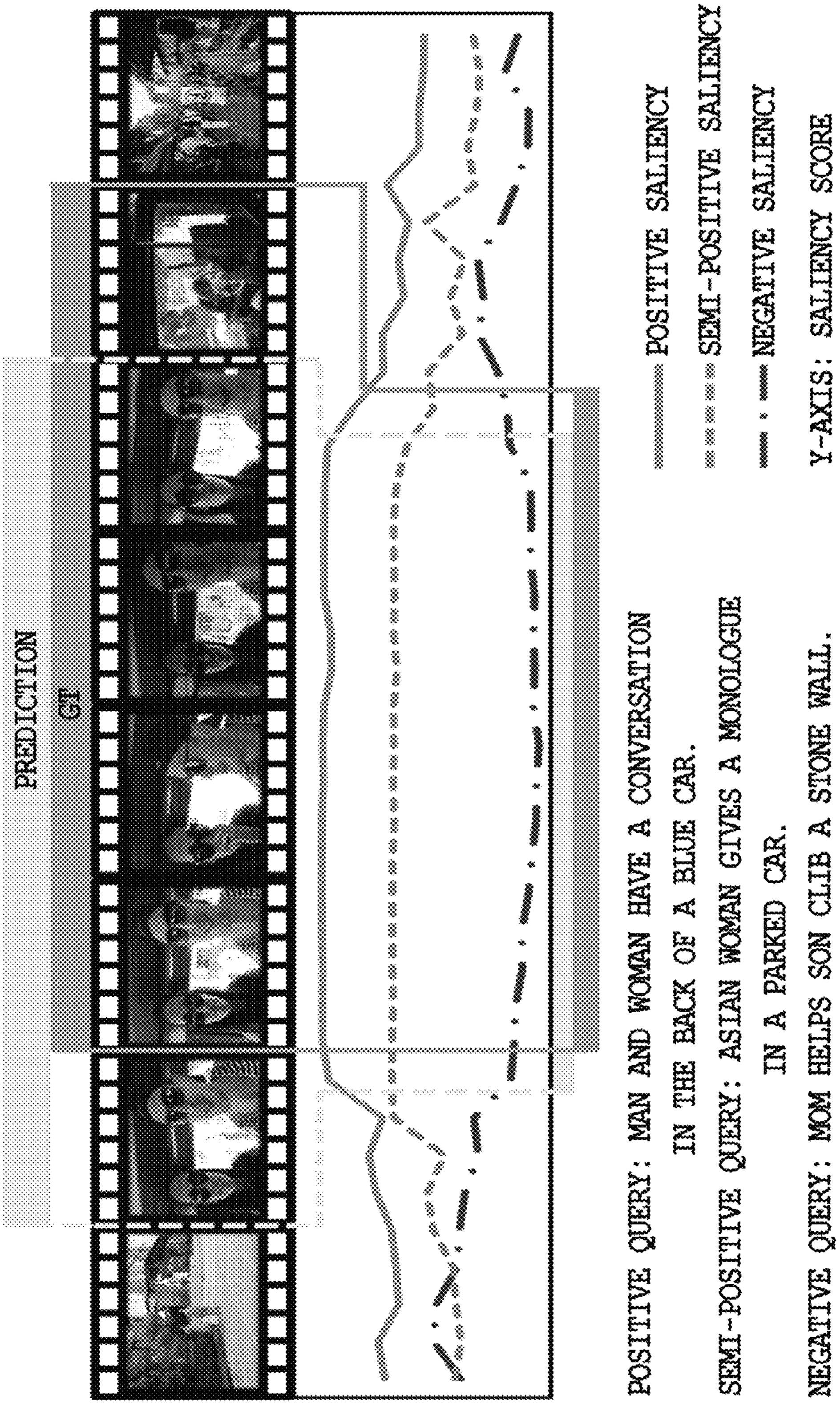
FIG. 19 shows results of moment retrieval and highlight detection of a video according to a relevance of a text query of the present disclosure.

FIG. 19 shows results of moment retrieval and highlight detection of a video according to a relevance of a text query of the present disclosure. Referring to FIG. 19, it may be seen that the higher the actual relevance between the text query and the video moment, the higher the saliency score. For example, the negative pair having low relevance showed the lowest saliency score, and the positive pair having high relevance showed the highest saliency score.

As described above, although the exemplary embodiments of the present disclosure have been illustrated and described, those skilled in the art will understand that various changes in form and detail may be made without departing from the spirit and scope of the present disclosure as defined by the appended claims and their equivalents.

The invention claimed is:

1. An electronic device for at least one of video moment retrieval and highlight detection, the device comprising:

a storage unit; and a processor, wherein the processor obtains a plurality of first video features each corresponding to a plurality of time points or time periods different from one another from a plurality of video clips of a video by using a video encoder through convolution operations or attention mechanisms, obtains a text query feature from a text query by using a text encoder through attention mechanism, wherein the processor, by using a cross-attention model, obtains a plurality of video queries from the plurality of first video features by performing multi-layer perceptron transformations, obtains a text key from the text query feature by performing multi-layer perceptron transformation, obtains a text value from the text query feature by performing multi-layer perceptron transformation, obtains a plurality of attention scores based upon the plurality of video queries, the text key, and the text value by performing dot product operations between the plurality of video queries and the text key, by performing softmax operations on results of the dot product operations and by performing multiplications between results of the softmax operations and the text value, obtains a plurality of weights from the plurality of attention scores by performing multi-layer perceptron transformations, obtains a plurality of second video features by multiplying each of the plurality of weights and each of the plurality of first video features, wherein the cross-attention model models a relationship between the text query and each of the video clips by correcting the plurality of first video features using the text query feature, wherein the processor, by using a transformer encoder, obtains a plurality of third video features and a second saliency token from the plurality of second video features and a first saliency token, wherein the processor obtains a plurality of saliency scores for the plurality of video clips based upon the plurality of third video features and the second saliency token, wherein the processor modifies the cross-attention model, the transformer encoder and the first saliency token such that at least one saliency score corresponding to a positive pair of the video and the text query is increased and at least one saliency score corresponding to a negative pair of the video and the text query is decreased, in order to reflect relevance of the text query to the video.

2. The device of claim 1, wherein the processor, obtains the plurality of saliency scores for the plurality of video clips by dot product of each of a plurality of output values from a first fully connected layer to which the plurality of third video features is inputted and an output value from a second fully connected layer to which the second saliency token is inputted.

3. The device of claim 2, wherein the first saliency token and the second saliency token are trainable vectors that enable input-adaptive saliency prediction.

4. The device of claim 1, wherein the video encoder comprises at least one of a convolutional neural network-based model and a transformer-based model.

5. The device of claim 1, wherein the text encoder comprises at least one of a recurrent neural network-based model and a transformer-based model.

6. The device of claim 1, wherein the processor obtains a plurality of fourth video features from the plurality of third video features and a time query by using a decoder, and selects at least one of the plurality of time points or time periods different from one another from the video by using the plurality of fourth video features.

7. The device of claim 6, wherein the time query includes a central time point and a length which define a time period.

8. The device of claim 1, wherein the cross-attention model improves performance of video moment retrieval and highlight detection by allowing text queries to impact output values of video moment retrieval and highlight detection.

9. A method of operating an electronic device for at least one of video moment retrieval and highlight detection, the method comprising:

(a) by using a video encoder, obtaining a plurality of first video features each corresponding to a plurality of time points or time periods different from one another from a plurality of video clips of a video through convolution operations or attention mechanisms;

(b) by using a text encoder, obtaining a text query feature from a text query through attention mechanism;

(c) by using a cross-attention model, (c1) obtaining a plurality of video queries from the plurality of first video features by performing multi-layer perceptron transformations;

(c2) obtaining a text key from the text query feature by performing multi-layer perceptron transformation;

(c3) obtaining a text value from the text query feature by performing multi-layer perceptron transformation;

(c4) obtaining a plurality of attention scores based upon the plurality of video queries, the text key, and the text value by performing dot product operations between the plurality of video queries and the text key, by performing softmax operations on results of the dot product operations and by performing multiplications between results of the softmax operations and the text value;

(c5) obtaining a plurality of weights from the plurality of attention scores by performing multi-layer perceptron transformations; and (c6) obtaining a plurality of second video features by multiplying each of the plurality of weights and each of the plurality of first video features, wherein the cross-attention model models a relationship between the text query and each of the video clips by correcting the plurality of first video features using the text query feature, (d) obtaining a plurality of third video features and a second saliency token from the plurality of second video features and a first saliency token by using a transformer encoder, (e) obtaining a plurality of saliency scores for the plurality of video clips based upon the plurality of third video features and the second saliency token, wherein the device modifies the cross-attention model, the transformer encoder and the first saliency token such that at least one saliency score corresponding to a positive pair of the video and the text query is increased and at least one saliency score corresponding to a negative pair of the video and the text query is decreased, in order to reflect relevance of the text query to the video.

10. The method of claim 9, wherein the step (d) comprises obtaining the plurality of saliency scores for the plurality of video clips by dot product of each of a plurality of output values from a first fully connected layer to which the plurality of third video features is inputted and an output value from a second fully connected layer to which the second saliency token is inputted.

11. The method of claim 10, wherein the first saliency token and the second saliency token are trainable vectors that change according to an inputted video and text query to predict saliency scores in an input-adaptive manner.

12. The method of claim 9, further comprising obtaining a plurality of fourth video features from the plurality of third video features and a time query by using a decoder, and selecting at least one of the plurality of time points or time periods different from one another from the video by using the plurality of fourth video features.

* * * * *